(12) United States Patent
Joshua et al.

(10) Patent No.: US 12,411,608 B2
(45) Date of Patent: Sep. 9, 2025

(54) I/O MODULATION SCHEME FOR ULTRA-HIGH DATA THROUGHPUT WITH MASSIVE NAND PARALLELISM

(71) Applicant: Western Digital Technologies, Inc., San Jose, CA (US)

(72) Inventors: Alvin Joshua, Fujisawa (JP); Hardwell Chibvongodze, Hiratsuka (JP); Zhixin Cui, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/349,651

(22) Filed: Jul. 10, 2023

(65) Prior Publication Data

US 2024/0377955 A1    Nov. 14, 2024

Related U.S. Application Data

(60) Provisional application No. 63/500,716, filed on May 8, 2023.

(51) Int. Cl.
*G06F 12/00* (2006.01)
*G06F 3/06* (2006.01)
(52) U.S. Cl.
CPC .......... *G06F 3/0613* (2013.01); *G06F 3/0659* (2013.01); *G06F 3/0688* (2013.01)

(58) Field of Classification Search
CPC .... G06F 3/0613; G06F 3/0659; G06F 3/0688; G06F 12/0238; G06F 13/161; G06F 13/20
See application file for complete search history.

(56) References Cited

U.S. PATENT DOCUMENTS

2022/0269437 A1* 8/2022 Muthiah ............... G06F 3/0661

* cited by examiner

*Primary Examiner* — Shawn X Gu
(74) *Attorney, Agent, or Firm* — Sheppard, Mullin, Richter & Hampton LLP

(57) ABSTRACT

Systems and methods disclosed herein provide a modulation scheme that enables memory dies of a memory stack to occupy a shared data line in parallel, which increases data throughput within the memory stack. The systems and methods disclosed herein modulate data input/output (I/O) signals to convert the data I/O signals from a first domain to a second domain. Each data I/O signal corresponds to a memory die. The data I/O signals are separated onto channels that are non-overlapping in the second domain and are supplied simultaneously to a data line. By separating the data I/O signal onto non-overlapping channels, the plurality of memory dies can be operated in parallel at approximately the same time. In an illustrative example, the first domain is the time domain and the second domain is the frequency domain, which the channels being separate, non-overlapping frequency bands.

20 Claims, 20 Drawing Sheets

I/O MODULATION SCHEME FOR ULTRA-HIGH DATA THROUGHPUT WITH MASSIVE NAND PARALLELISM

CROSS REFERENCE TO RELATED APPLICATIONS

This application claims the benefit of and priority to U.S. Provisional Patent Application No. 63/500,716, filed on May 8, 2023, the contents of which are incorporated herein by reference in their entirety.

BACKGROUND

Semiconductor memory is widely used in various electronic devices, such as cellular telephones, digital cameras, personal digital assistants, medical electronics, mobile and non-mobile computing devices, vehicles, and so forth. Such semiconductor memory may comprise non-volatile memory and/or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

NAND-type flash memories may typically have multiple memory dies or chips controlled by a controller. There may be any number of dies stacked on the same I/O channel or interface with the controller. Each die contains a memory structure and peripheral circuits. Many of these memory dies may be involved in various memory operations including input or output operations with the memory controller.

The input/output ("I/O") requirements of these NAND-type flash memories are demanding and the data transfer rates on the I/O interface are increasing as technology advances. As the data transfer rates between the controller and the memory dies increase, it is becoming more difficult to take advantage of the increased data transfer rates due to limitations within the die stack.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
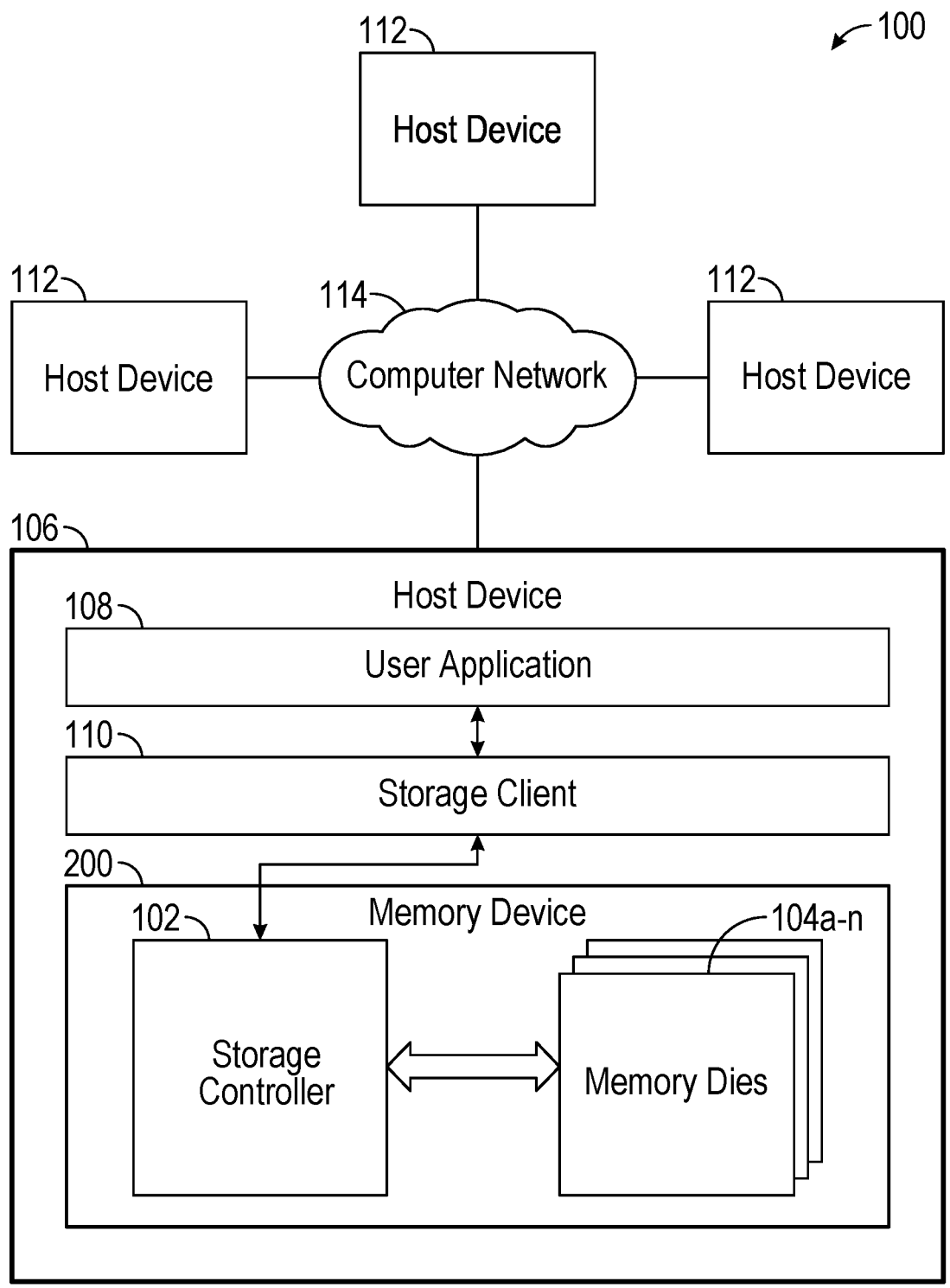
FIG. 1 is a block diagram of an example memory system, in connection with which example embodiments of the disclosed technology can be implemented.

The figures are not exhaustive and do not limit the present disclosure to the precise form disclosed.

DETAILED DESCRIPTION

As introduced above, data transfer rates between a memory controller and a memory array (e.g., a stack of memory dies or chips) are increasing. For example, current NAND-type flash memories can provide for data transfer rates up to 8 GB/s of available bandwidth, and this is expected to increase up to 16 GB/s of bandwidth. As technology advances, these data transfer rates are expected to continue to increase. However, conventional memory die architecture permits only one memory die of a stack to be active at any one time. Thus, I/O throughput on a conventional memory die stack is bottlenecked to the throughput of a single memory die. For example, conventional memory systems provide for data I/O lines that are interconnected between each memory die in a stack. As a result of this shared configuration of the data I/O lines, only one memory die can be actively using a data I/O line at any one time.

Thus, other memory dies of the stack cannot be active, and must wait for the data I/O line to become unoccupied.

The limitation of a single memory die being active on a shared data I/O line at any given time results in a bottleneck of the throughput to a throughput capable of one memory die. Thus, regardless as to the rate that data is provided to the memory stack from the storage controller, total I/O throughput can be only one times memory die throughput. Thus, as I/O transfer rates increase and exceed the throughput of the individual memory dies, the total throughput of the memory system is limited to that of the memory die.

Embodiments of the technology disclosed herein provide a technical solution by providing an I/O modulation scheme that can enable multiple memory dies to occupy a shared data I/O line in parallel, which can be used to increase I/O throughput within the memory stack. The modulation scheme in accordance with the disclosed embodiments modulates the IO signals to convert data signals from one domain to another domain. Various embodiments disclosed herein apply the modulation scheme to I/O data in a time domain so as to multiplex the I/O data into the frequency domain. As a result, I/O data can be separated into a series of non-overlapping frequency bands (also referred to herein as frequency channels), which can be supplied simultaneously to the data I/O line in parallel. By separating the I/O data into non-overlapping frequency bands, multiple memory dies of a memory stack can be operated in parallel at approximately the same time.

Due to the parallelism achieved according to the embodiments disclosed herein, the bottleneck on the data I/O lines can be avoided and total I/O throughout is increased proportional to the number of memory dies in the memory stack. For example, total I/O throughput can be increased by n times the throughput of a memory die, where n is the number of memory dies operated in parallel. Thus, embodiments disclosed herein can utilize more efficiently the increased data transfer rates offered at a memory interface, such as highspeed (e.g., up to 8 GB/s) and ultra-highspeed transfer speeds (e.g., 16 GB/s and beyond) from a storage controller, to increase overall I/O transfer rates.

As used herein "approximately" and "nearly" refer to permissible variations in properties of the implementations disclosed herein. Implementations disclosed herein may have certain properties, attributes, and/or characteristics that include some acceptable variation that does not significantly affect the functioning of the disclosed implementations. For example, embodiments disclosed herein refer to "approximately simultaneously" and "near simultaneously", which refer to permissible variations in memory architectures (such as communication distances and other attributes) that may cause permissible delays in one operation relative to another operation. Thus, when a first component simultaneously transmits multiple data packets, variations in memory architecture may cause one packet to arrive slightly delayed at a first memory die relative to other packets. Further, near simultaneous can refer to a data transfer to/from one memory die does not interfere and/or prohibit data transfer or command sequence to another memory die. That is, for example, each memory die can receive/send data or command sequence independently and perform related operations without having to wait for other memory die(s) to finish their data transfer (e.g., one die using data bus or data I/O lines will not prohibit the other dies from doing the same).

FIGS. 1 to 4H depict an example memory system that can be used to implement the technology disclosed herein. FIG. 1 is a schematic block diagram illustrating a memory system 100. The memory system 100 includes a memory device 200 (also referred to herein as a storage device), a host device 106, at least one host device 112, and a computer network 114.

The host device 106 may be a computing device (e.g., laptop, desktop, smartphone, tablet, digital camera, wearable smart device, and so on) that includes one or more processors and readable storage devices (such as, but not limited to, RAM, ROM, flash memory, hard disk drive, solid state memory) that store processor readable code (also referred to herein as instructions or software) for programming storage controller 102 to perform the methods described herein. The host device 106 may also include additional system memory, one or more input/output interfaces, and/or one or more input/output devices in communication with the one or more processors, as well as other components well known in the art.

The memory system 100 includes at least one memory device 200, comprising the storage controller 102 and a plurality of memory dies 104. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

In some embodiments, the memory system 100 may include two or more memory devices. Each memory device 200 may include a plurality of memory dies 104, such as flash memory, nano random access memory ("nano RAM or NRAM"), magneto-resistive RAM ("MRAM"), dynamic RAM ("DRAM"), phase change RAM ("PRAM"), etc. The data memory device 200 may also include other types of non-volatile and/or volatile data storage, such as dynamic RAM ("DRAM"), static RAM ("SRAM"), magnetic data storage, optical data storage, and/or other data storage technologies.

The memory device 200 may be a component within a host device 106 as depicted in FIG. 1, and may be connected using a system bus, such as a peripheral component interconnect express ("PCI-e") bus, a Serial Advanced Technology Attachment ("serial ATA") bus, or the like. In another embodiment, the memory device 200 may be external to the host device 106 and is connected via a wired connection, such as, but not limited to, a universal serial bus ("USB") connection, an Institute of Electrical and Electronics Engineers ("IEEE") 1394 bus ("FireWire"), or the like. In other embodiments, the memory device 200 may be connected to the host device 106 using a peripheral component interconnect ("PCI") express bus using external electrical or optical bus extension or bus networking solution such as Infiniband or PCI Express Advanced Switching ("PCIe-AS"), or the like.

In various embodiments, the memory device 200 may be in the form of a dual-inline memory die ("DIMM"), a daughter card, or a micro-module. In another embodiment, the memory device 200 may be a component within a rack-mounted blade. In another embodiment, the memory device 200 may be contained within a package that is integrated directly onto a higher level assembly (e.g., mother-board, laptop, graphics processor, etc.). In another embodiment, individual components comprising the memory device 200 may be integrated directly onto a higher level assembly without intermediate packaging.

In some embodiments, instead of directly connected to the host device 106 via a wired connection, the data memory device 200 may be connected to the host device 106 over a wireless connection. For example, the data memory device 200 may include a storage area network ("SAN") storage device, a network attached storage ("NAS") device, a network share, or the like. In some embodiments, the memory system 100 may be connected to the host via a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 106 and the data memory device 200.

The memory system 100 includes at least one host device 106 connected to the memory device 200. Multiple host devices may be used and may comprise a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. "Computer" refers to any computing device. Examples of a computer include, but are not limited to, a personal computer, a laptop, a tablet, a desktop, a server, a main frame, a supercomputer, a computing node, a virtual computer, a hand held device, a smart phone, a cell phone, a system on a chip, a single chip computer, and the like. In another embodiment, a host device 106 may be a client and the memory device 200 may operate autonomously to service data requests sent from the host device 106. In this embodiment, the host device 106 and memory device 200 may be connected using a computer network, system bus, DAS or other communication means suitable for connection between a computer and an autonomous memory device 200.

The illustrative example shown in FIG. 1, the memory system 100 includes a user application 108 in communication with a storage client 110 as part of the host device 106. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

In various embodiments, the user application 108 may be a software application operating on or in conjunction with the storage client 110. The storage client 110 manages files and data and utilizes the functions and features of the storage controller 102 and associated memory dies 104. "File" refers to a unitary data structure for storing, retrieving, and communicating data and/or instructions. A file is distinguished from other types of packaging by having associated management metadata utilized by the operating system to identify, characterize, and access the file. Representative examples of storage clients include, but are not limited to, a server, a file system, an operating system, a database management system ("DBMS"), a volume manager, and the like. The storage client 110 may be in communication with the storage controller 102 within the memory device 200.

In various embodiments, the memory system 100 may include one or more clients connected to one or more host device 112 through one or more computer networks 114. A host device 112 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 114 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 114 may also include a network from the IEEE 802 family of network technologies, such Ethernet, token ring, WiFi, WiMax, and the like.

The computer network 114 may include servers, switches, routers, cabling, radios, and other equipment used to facilitate networking the host device 106 or host devices and host devices 112 or clients. In some embodiments, the memory system 100 may include one or more host devices 112 and host device 106 that communicate as peers over a computer network 114. In other embodiments, the memory system 100 may include multiple memory devices 200 that communicate as peers over a computer network 114. One of skill in the art will recognize other computer networks comprising one or more computer networks and related equipment with single or redundant connection(s) between one or more clients or other computer with one or more memory devices 200 or one or more memory devices 200 connected to one or more host devices. In one embodiment, the memory system 100 may include two or more memory devices 200 connected through the computer network 114 to a host device 112 without a host device 106.

In some embodiments, the storage client 110 communicates with the storage controller 102 through a host device interface comprising an Input/Output (I/O) interface. "Interface" refers to a protocol and associated circuits, circuitry, components, devices, systems, sub-systems, and the like that enable one device, component, or apparatus to interact and/or communicate with another device, component, or apparatus. For example, the memory device 200 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. A sector of data is typically 512 bytes, corresponding to the size of a sector in magnetic disk drives.

In various embodiments number of sectors form a block (or data block), anywhere from 8 sectors, which is 4 KB, for example, up to 32, 64, 128 or more sectors. Different sized blocks and sectors can also be used. In certain storage systems, such as those interfacing with the Windows® operating systems, the data blocks may be referred to as clusters. In other storage systems, such as those interfacing with UNIX, Linux, or similar operating systems, the data blocks may be referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die(s) 104. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

Management of a data block by a storage manager may include specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition. In conventional block storage devices, a logical address, also referred to as a logical block address (LBA), maps directly to a particular data block on physical storage media. In conventional block storage devices, each data block maps to a particular set of physical sectors on the physical storage media.

However, certain storage devices need not directly or necessarily associate logical addresses with particular physical data blocks. These storage devices may emulate a conventional block storage interface to maintain compatibility with a block storage client 110.

In some embodiments, the storage controller 102 may provide a block I/O emulation layer, which serves as a block device interface, or API. In these embodiments, the storage client 110 communicates with the storage device through this block device interface. The block I/O emulation layer may receive commands and logical addresses from the storage client 110 in accordance with this block device interface. As a result, the block I/O emulation layer may provide the storage device compatibility with a block storage client 110.

In some embodiments, a storage client 110 communicates with the storage controller 102 through a host device interface comprising a direct interface. In these embodiments, the memory device 200 directly exchanges information specific to non-volatile storage devices. Memory device 200 using direct interface may store data in the memory die(s) 104 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die(s) 104.

The storage controller 102 may receive a logical address and a command from the storage client 110 and perform the corresponding operation in relation to the memory die(s) 104. The storage controller 102 may support block I/O emulation, a direct interface, or both.

Figure 2A:
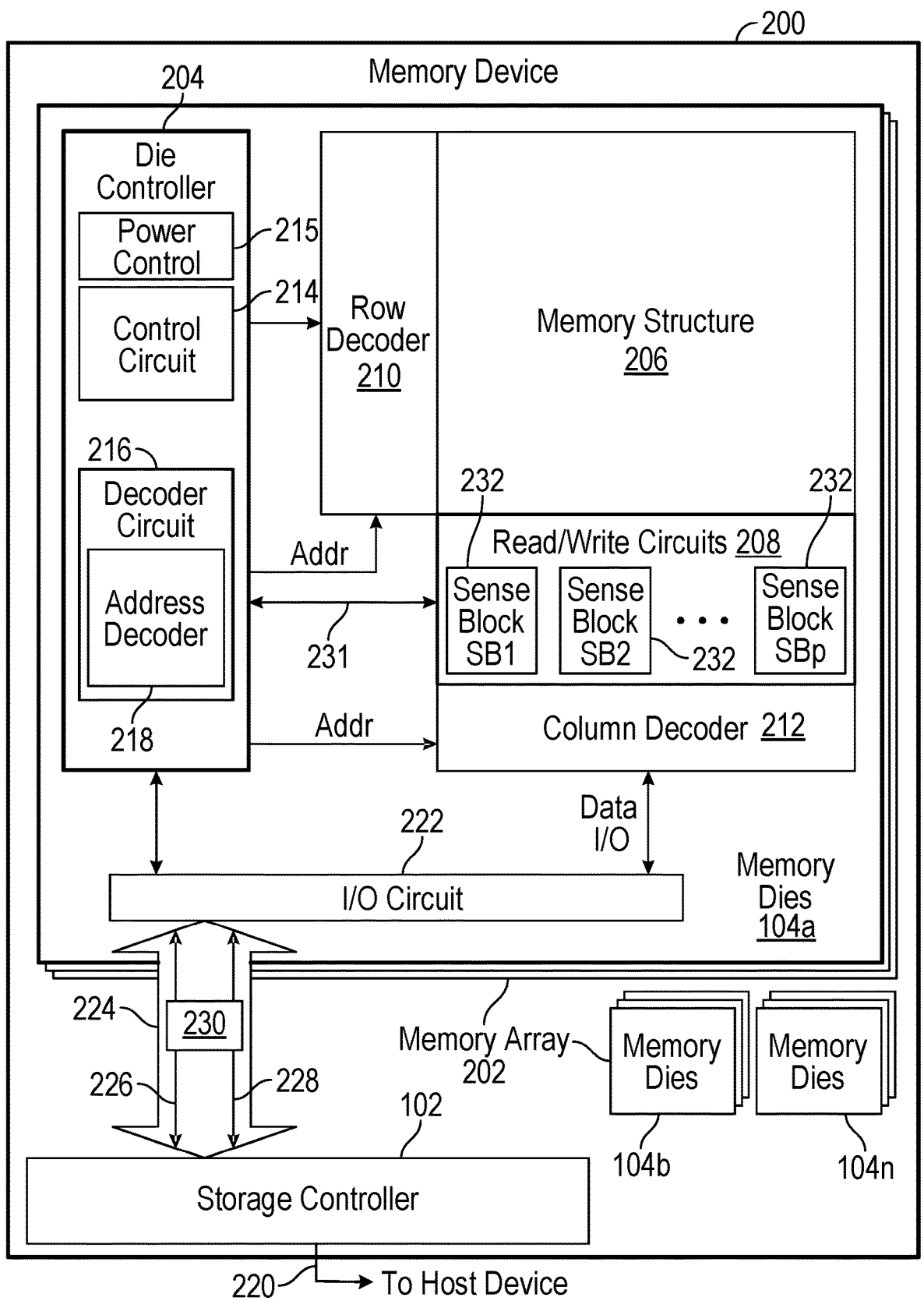
FIG. 2A is a block diagram of an example memory device, in connection with which example embodiments of the disclosed technology can be implemented.

FIG. 2A is a functional block diagram of an example memory device 200. The components depicted in FIG. 2A are electrical circuits.

The memory device 200 may include a storage controller 102 and a memory array 202 comprised of a number of memory dies 104a-n, the storage controller 102 and memory dies 104a-n being effectively as described with regard to FIG. 1. Each memory die 104a-n can be a complete memory die or a partial memory die and may include a die controller 204, at least one memory structure 206, and read/write circuits 208. The following description will be made with reference to memory die 104a as an example of memory dies 104a-n, where each memory die may include same or similar components and function in the same or similar way. Thus, while reference herein is made to memory die 104a, the same description may be applied equally to memory dies 104b-n.

In this context, "memory array" refers to a set of memory cells (also referred to as storage cells) organized into an array structure having rows and columns. A memory array is addressable using a row identifier and a column identifier, each represented as part of an address, such as a command address. A non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

In the context of FIG. 2A, memory structure 206 may be addressable by wordlines via a row decoder 210 and by bitlines via a column decoder 212. The read/write circuits 208 include multiple sense blocks 232 including SB1, SB2, . . . , SBp (sensing circuitry) and allow a pages of memory cells to be read or programmed in parallel. Also, many strings of memory cells can be erased in parallel.

"Circuitry", as used herein, refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

A physical page may include memory cells along a row of the memory array for a single plane or for a single memory die. In some embodiments, each memory die 104*a-n* includes a memory array made up of two equal sized planes. A plane is a division of the memory array that permits certain storage operations to be performed on both places using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

The memory structure 206 can be two-dimensional (2D-laid out in a single fabrication plane) or three-dimensional (3D-laid out in multiple fabrication planes). The non-volatile memory array 206 may comprise one or more arrays of memory cells including a 3D array. In one embodiment, the non-volatile memory array 206 may comprise a monolithic three-dimensional memory structure (3D array) in which multiple memory levels are formed above (and not in) a single substrate, such as a wafer, with no intervening substrates. The non-volatile memory array 206 may comprise any type of non-volatile memory that is monolithically formed in one or more physical levels of arrays of memory cells having an active area disposed above a silicon substrate. The non-volatile memory array 206 may be in a non-volatile solid state drive having circuitry associated with the operation of the memory cells, whether the associated circuitry is above or within the substrate. Word lines may comprise sections of the layers containing memory cells, disposed in layers above the substrate. Multiple word lines may be formed on single layer by means of trenches or other non-conductive isolating features.

The die controller 204 (also referred to as a die control circuitry) cooperates with the read/write circuits 208 to perform memory operations on memory cells of the non-volatile memory array 206 and includes a control circuit 214 (also referred to as a state machine) and a decoder circuit 216 that may incorporate an address decoder 218. The control circuit 214 provides chip-level control of memory operations on the memory die 104*a*. The die controller 204 may also include power control circuit 215 that controls the power and voltages supplied to the wordlines, bitlines, and select lines during memory operations. The power control circuit 204 may include voltage circuitry, in one embodiment. Power control circuit 204 may include charge pumps for creating voltages. The sense blocks 232 include bitline drivers. The power control circuit 215 executes under control of the control circuit 214, in various embodiments.

"Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components. In one example, the die controller may include buffers such as registers, read-only memory (ROM) fuses and other storage devices for storing default values such as base voltages and other parameters.

"Control circuit" refers to a device, component, element, module, system, sub-system, circuitry, logic, hardware, or circuit configured and/or operational to manage one or more other circuits. For example, a controller programmed by firmware to perform the functions described herein is one example of a control circuit. A control circuit can include a processor, a PGA (Programmable Gate Array), an FPGA (Field Programmable Gate Array), an ASIC (Application Specific Integrated Circuit), or another type of integrated circuit or circuit more generally. In certain embodiments, a control circuit is responsible to ensure that primary features and functionality of a larger circuit, die, or chip, that includes the control circuit, perform properly. The address decoder 218 provides an address interface between that used by the host or a storage controller 102 to the hardware address used by the row decoder 210 and column decoder 212.

Commands and data are transferred between the host device and storage controller 102 via a data bus 220, and between the storage controller 102 and an input/output (IO) circuit 222 on each of the memory dies 104*a-n* via a memory interface 224. The memory interface 224 may be a type of communication bus, comprising a control bus 226 and a data bus 228 (also referred to herein as I/O data bus), over which fixed length command sequences 230 may be transmitted. "Memory interface" refers to an interface between a memory die and a storage controller. Examples of memory interface that may be used in connection with the disclosed solution include Toggle Mode ("TM"), Toggle NAND 2.0, Open NAND Flash Interface (ONFI) NAND, a vendor specific interface, a proprietary interface, and the like. In the depicted embodiment, the memory interface 224 is a proprietary interface configured to transfer fixed length command sequences 230.

"Communication bus" refers to hardware, software, firmware, logic, control line(s), and one or more associated communication protocols, that are configured to enable a sender to send data to a receiver. A communication bus may include a data bus and/or a control bus.

"Firmware" refers to logic embodied as processor-executable instructions stored on volatile memory media and/or non-volatile memory media.

"Data bus" refers to a communication bus used to exchange one or more of data bits between two electronic circuits, components, chips, die, and/or systems. A data bus may include one or more signal/control lines. A sender, such as a controller, may send data signals over one or more control lines of the data bus in parallel (operating as a parallel bus) or in series (operating as a serial bus). A data bus may include the hardware, control line(s), software, firmware, logic, and/or the communication protocol used to operate the data bus.

Examples data buses may include 8-bit buses having 8 control lines, 16-bit buses having 16 control lines, 32-bit buses having 32 control lines, 64-bit buses having 64 control lines, and the like. Control lines may carry exclusively communication data, exclusively address data, exclusively control data, or any combination of these types of data.

In various embodiments, a single data bus may be shared by a plurality of components, such as memory die. When multiple chips or memory dies share a data bus, that data may be accessed or transferred by a single memory die or by all the memory dies in parallel based on signals on a chip enable control line.

A data bus may operate, and be configured, according to an industry standard or based on a proprietary protocol and design. Multiple control line of a data bus may be used in parallel and may latch data into latches of a destination component according to a clocking signal, data strobe signal ("DQS"), or clock, such as strobe signal. In certain embodiments, a control bus and a data bus together may form a communication bus between a sender and a receiver.

"Control bus" refers to a communication bus used to exchange one or more of data, address information, control signals, clock signals, and the like, between two electronic circuits, components, chips, die, and/or systems. A control bus may comprise 1 or more control lines, be configured to operate as a parallel bus or a serial bus, and may include the hardware, control line(s), software, firmware, logic, and/or the communication protocol used to operate the control bus. Typically, a control bus sends control signals to one or more memory die to manage operations on the memory die.

In certain embodiments, the control bus sends control signals such as, for example, one or more of, a write enable ("WE"), chip enable ("CEn"), read enable ("RE"), a clock signal, strobe signal ("DQS"), command latch enable ("CLE"), address latch enable ("ALE"), and the like.

In certain embodiments, the control bus may not transfer data relating to a storage operation, such as write data or read data. Instead, write data and read data may be transferred over a data bus. In certain embodiments, a control bus and a data bus together may form a communication bus between a sender and a receiver.

The address decoder 218 of the die controller 204 may be coupled to the memory structure 206 in order to identify a location within the memory structure 206 for a storage command. In particular, the address decoder 218 determines a row identifier and a column identifier which together identifies the location within the memory structure 206 that applies to a storage command associated with a command address. The storage command and command address are received in a fixed length command sequence.

The input/output (IO) circuit 222 may be coupled, through the memory interface 224 and to the memory interface circuit 234 of the storage controller 102, to a data bus 220 in order to receive a fixed length command sequence 230. The decoder circuit 216 of the die controller 204 may be coupled through the input/output (IO) circuit 222 to a control bus 226 to receive fixed length command sequences 230 over the data bus 220 via memory interface circuit 234. In one embodiment, the data bus 220 may comprise eight control lines, each configured to transfer one bit in parallel across the data bus 220.

The decoder circuit 216 may decode a command address and a storage command from a fixed length command sequence. The control circuit 214 of the die controller 204 may be coupled to the input/output (IO) circuit 222 and decoder circuit 216 and may generate control signals 231 to execute storage commands decoded by the decoder circuit 216. "Control signal" refers to an electrical signal (wired or wireless) sent from one device, component, manager, or controller to another device, component, manager, or controller configured to act in response to the control signal.

The read/write circuits 208 may be coupled to the non-volatile memory array 206 and the control circuit 214 in order to transfer data between the non-volatile memory array 206 and the input/output (IO) circuit 222 in response to the storage commands.

In some implementations, some of the components can be combined. In various designs, one or more of the components (alone or in combination), other than memory structure 206, can be thought of as at least one control circuit or storage controller which is configured to perform the techniques described herein. For example, a control circuit may include any one of, or a combination of, storage controller 102, die controller 204, read/write circuits 208, column decoder 212, control circuit 214, decoder circuit 216, address decoder 218, sense blocks SB1, SB2, . . . , SBp, and so forth.

Associated circuitry may be required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

In various embodiments, memory structure 206 comprises a three-dimensional (3D) memory array of non-volatile memory cells in which multiple memory levels are formed above a single substrate, such as a wafer. The memory structure may comprise any type of non-volatile memory monolithically formed in one or more physical levels of arrays of memory cells having an active area disposed above a silicon (or other type of) substrate. In one example, the non-volatile memory cells comprise vertical NAND strings with charge-trapping material. In another embodiment, memory structure 206 comprises a two-dimensional (2D) memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 206 is not limited to the examples above. Many different types of memory array architectures or memory technologies can be used to form memory structure 206. No particular non-volatile memory technology is required for purposes of the new claimed embodiments proposed herein. Other examples of suitable technologies for memory cells of the memory structure 206 include resistive random access memory (ReRAM) memories, magnetoresistive RAM (MRAM) memory (e.g., MRAM, Spin Transfer Torque MRAM, Spin Orbit Torque MRAM), phase change memory (PCM), and the like. Examples of suitable technologies for memory cell architectures of the memory structure 206 include 2D arrays, 3D arrays, cross-point arrays, stacked 2D arrays, vertical bitline arrays, and the like.

Cross point memory-one example of a ReRAM or PCM RAM-includes reversible resistance-switching elements arranged in cross point arrays accessed by X lines and Y lines (e.g., wordlines and bitlines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one that is relatively inert (e.g., tungsten) and the other of which is electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

MRAM stores data within magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device can be built from a grid of such memory cells. In one embodiment for programming, each memory cell lies between a pair of write lines arranged at right angles to each other, parallel to the cell, one above and one below the cell. When current is passed through them, an induced magnetic field is created.

PCM exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). As such, the programming doses are laser pulses. The memory cells can be inhibited by blocking the memory cells from receiving the light. Note that the use of "pulse" in this document does not require a square pulse, but also includes a continuous (or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 2B:
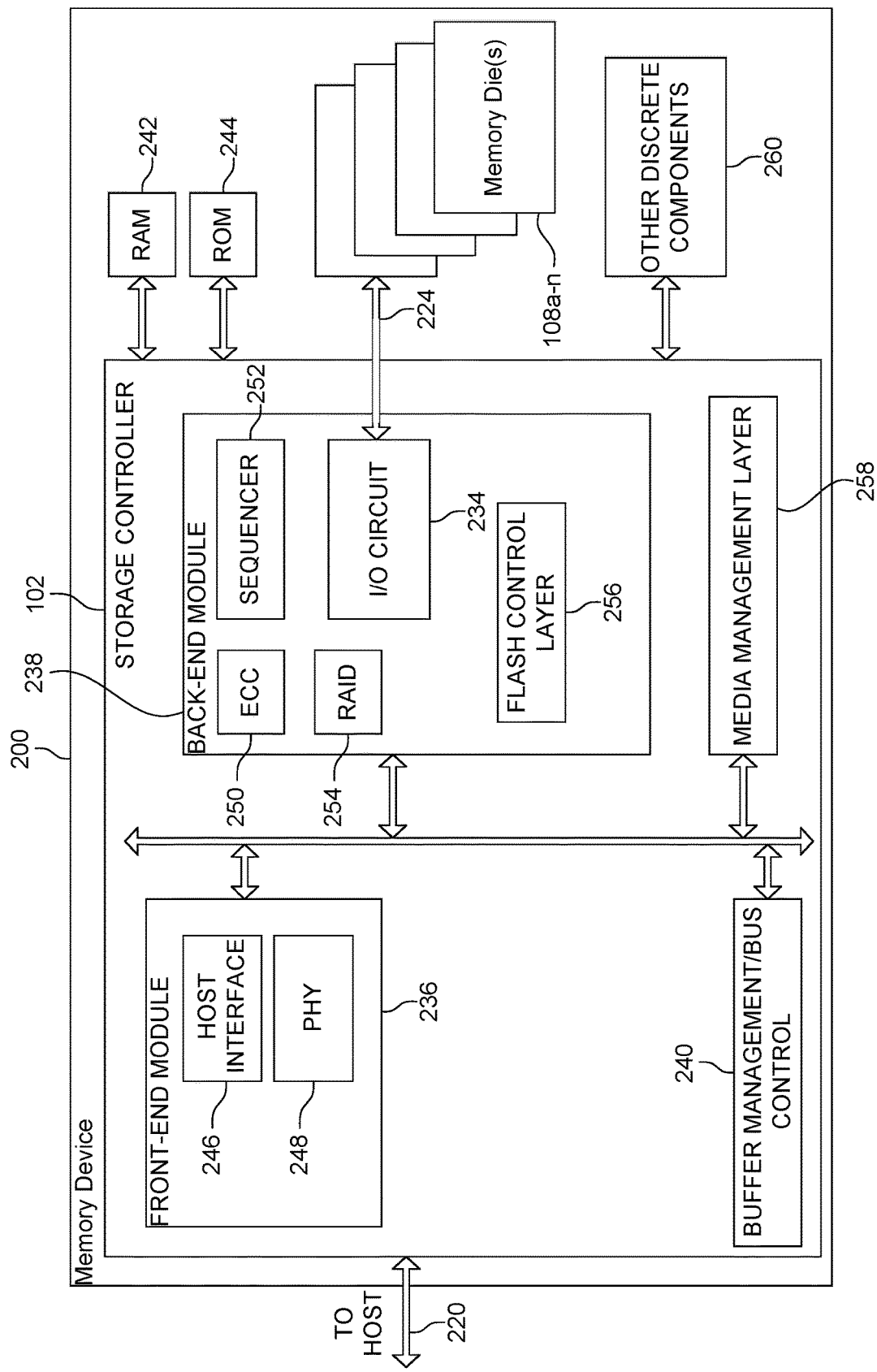
FIG. 2B is a block diagram of an example memory device that depicts more details of an example controller, in connection with which example embodiments of the disclosed technology can be implemented.

FIG. 2B is a block diagram of example memory device 200 that depicts more details of one embodiment of controller 102. While the storage controller 102 in the embodiment of FIG. 2B is a flash memory controller, it should be appreciated that memory device 200 is not limited to flash memory. Thus, the storage controller 102 is not limited to the particular example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In an example operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host itself can provide the physical address. The flash memory controller can also perform various memory management functions including, but not limited to, wear leveling (distributing writes to avoid wearing out specific blocks of memory that would otherwise be repeatedly written to) and garbage collection (after a block is full, moving only the valid pages of data to a new block, so that the full block can be erased and reused).

The interface between storage controller 102 and memory dies 104 may be any suitable flash interface, such as Toggle Mode 200, 400, or 800. In one embodiment, memory device 200 may be a card-based system, such as a secure digital (SD) or a micro secure digital (micro-SD) card. In an alternate embodiment, memory system 100 may be part of an embedded memory system. For example, the flash memory may be embedded within the host. In other examples, memory device 200 can be a solid state drive (SSD).

In some embodiments, memory device 200 includes a single channel between storage controller 102 and memory die 108. However, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if only a single channel is shown in the drawings.

As depicted in FIG. 2B, storage controller 102 includes a front-end module 236 that interfaces with a host, a back-end module 238 that interfaces with the memory die 108, and various other modules that perform functions which will now be described in detail. The components of storage controller 102 depicted in FIG. 2B may take various forms including, without limitation, a packaged functional hardware unit (e.g., an electrical circuit) designed for use with other components, a portion of a program code (e.g., software or firmware) executable by a (micro) processor or processing circuitry that usually performs a particular function of related functions, a self-contained hardware or software component that interfaces with a larger system, or the like. For example, each module may include an ASIC, an FPGA, a circuit, a digital logic circuit, an analog circuit, a combination of discrete circuits, gates, or any other type of hardware or combination thereof. Alternatively or additionally, each module may include software stored in a processor readable device (e.g., memory) to program a processor to enable storage controller 102 to perform the functions described herein.

Referring again to modules of the storage controller 102, a buffer manager/bus control 240 manages buffers in RAM 242 and controls the internal bus arbitration of storage controller 102. ROM 244 stores system boot code. Although illustrated in FIG. 2B as located separately from the storage controller 102, in other embodiments, one or both of RAM 242 and ROM 244 may be located within the storage controller 102. In yet other embodiments, portions of RAM 242 and ROM 244 may be located within the storage controller 102, while other portions may be located outside the controller. Further, in some implementations, the storage controller 102, RAM 242, and ROM 244 may be located on separate semiconductor dies.

Front-end module 236 includes a host interface 246 and a physical layer interface (PHY) 248 that provide the electrical host interface 220 with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back-end module 238 includes an error correction code (ECC) engine 250 that encodes the data bytes received from the host, and decodes and error corrects the data bytes read from the memory dies 104. A command sequencer 252 generates command sequences, such as program and erase command sequences, to be transmitted to memory dies 104.

A RAID (Redundant Array of Independent Dies) module 254 manages generation of RAID parity and recovery of failed data. The RAID parity may be used as an additional level of integrity protection for the data being written into the memory device 200. In some cases, the RAID module 254 may be a part of the ECC engine 250. Note that the RAID parity may be added as one or more extra dies, or may be added within the existing die, e.g., as an extra plane, an extra block, or extra WLs within a block. As described above in connection with FIG. 2A, the memory interface circuit 234 provides command sequences 230 to memory die 104 and receives status information from memory die 104, via memory interface 224. A flash control layer 256 controls the overall operation of back-end module 238.

Additional components of memory device 200 illustrated in FIG. 2B include media management layer (MML) 258, which performs wear leveling of memory cells of memory dies 104, as well as, other discrete components 260, such as external electrical interfaces, external RAM, resistors, capacitors, or other components that may interface with storage controller 102. In alternative embodiments, one or more of the physical layer interface 248, RAID module 254, MML 258, or buffer management/bus controller 240 are optional components.

MML 258 (e.g., Flash Translation Layer (FTL)) may be integrated as part of the flash management for handling flash errors and interfacing with the host. In particular, MML 258 may be a module in flash management and may be responsible for the internals of NAND management. In particular, MML 258 may include an algorithm in the memory device firmware which translates writes from the host into writes to the memory structure 205 of each memory die 104. MML 258 may be needed because: 1) the memory structure 206 may have limited endurance; 2) the memory structure 206 may only be written in multiples of pages; and/or 3) the memory structure 206 may not be written unless it is erased as a block (or a tier within a block in some embodiments). MML 258 understands these potential limitations of the memory structure 206 which may not be visible to the host. Accordingly, MML 258 attempts to translate the writes from host into writes into the memory structure 206.

Storage controller 102 may interface with one or more memory dies 104. In one embodiment, storage controller 102 and multiple memory dies (together comprising non-volatile storage system 100) implement an SSD, which can emulate, replace, or be used in place of a hard disk drive inside a host, as a network access storage (NAS) device, in a laptop, in a tablet, in a server, etc. Additionally, the SSD need not be made to work as a hard drive.

Some embodiments of the memory device 200 may include one memory dies 104 connected to one storage controller 102. Other embodiments may include multiple memory dies 104 in communication with one or more controllers 102. In one example, the multiple memory dies 104 can be grouped into a set of memory packages. Each memory package may include one or more memory dies 104 in communication with storage controller 102. In one embodiment, a memory package includes a printed circuit board (or similar structure) with one or more memory dies 104 mounted thereon. In some embodiments, a memory package can include molding material to encase the memory dies 104 of the memory package. In some embodiments, storage controller 102 is physically separate from any of the memory packages.

Figure 3:
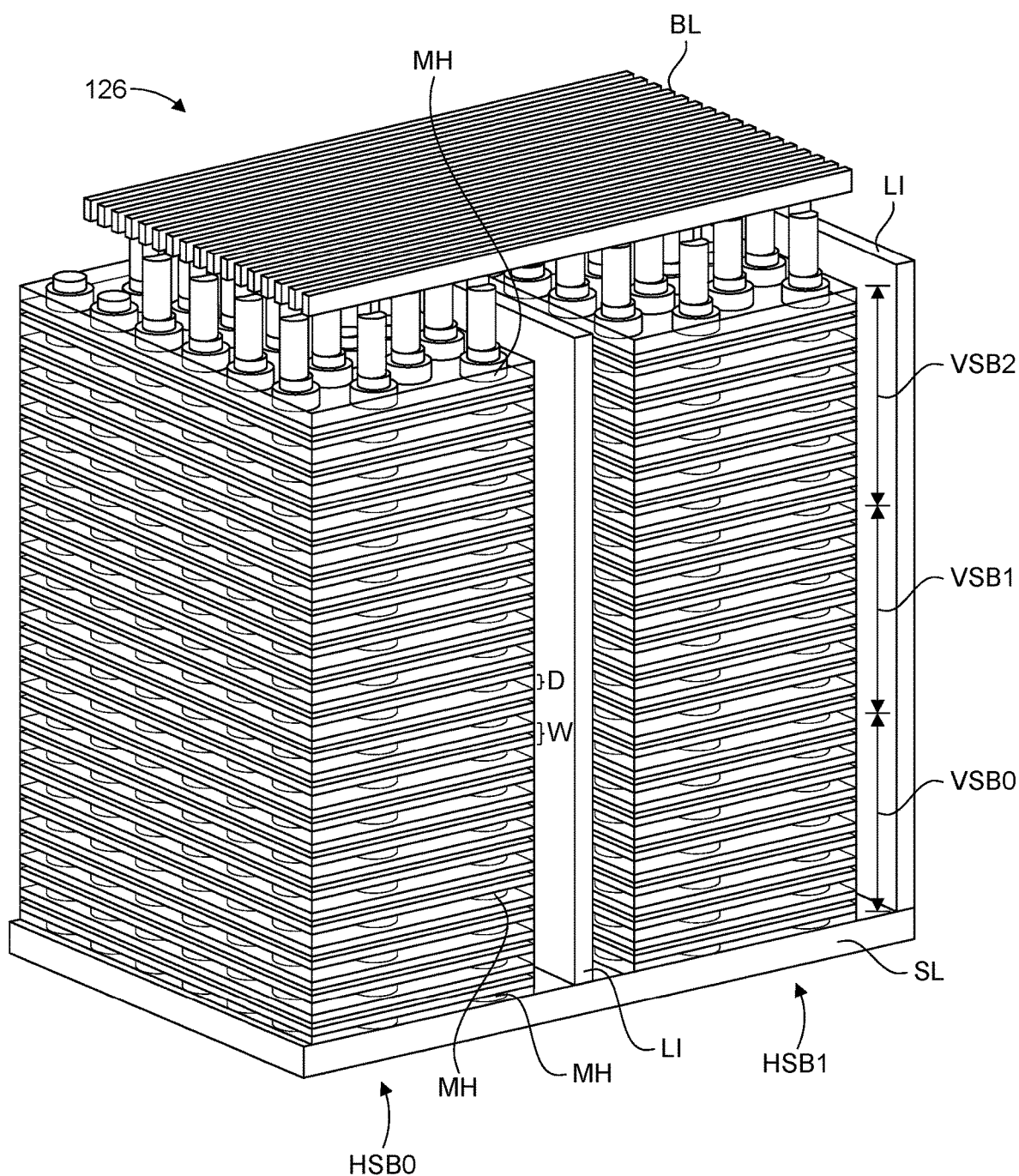
FIG. 3 is a perspective view of a portion of an example monolithic three-dimensional memory structure, in connection with which example embodiments of the disclosed technology can be implemented.

FIG. 3 is a perspective view of a portion of a monolithic 3D memory array that includes a plurality of non-volatile memory cells, and that can comprise memory structure 206 in one embodiment. FIG. 3 illustrates, for example, a portion of one block of memory. The structure depicted includes a set of bitlines (BLs) positioned above a stack of alternating dielectric layers and conductive layers. For example purposes, one of the dielectric layers is marked as D and one of the conductive layers (also called wordline layers) is marked as W. The number of alternating dielectric and conductive layers can vary based on specific implementation requirements. In some embodiments, the 3D memory array includes between 108-300 alternating dielectric and conductive layers. One example embodiment includes 96 data wordline layers, 8 select layers, 6 dummy wordline layers, and I/O dielectric layers. More or less than 108-300 layers can also be used. Data wordline layers include data memory cells. Dummy wordline layers include dummy memory cells. As will be explained below, the alternating dielectric and conductive layers are divided into four "fingers" by local interconnects LI. FIG. 3 shows two fingers and two local interconnects LI. Below the alternating dielectric layers and wordline layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the 3D monolithic memory array that may comprise memory structure 206 is provided below with respect to FIGS. 4A-4G.

One of the local interconnects LI separates the block into two horizontal sub-blocks HSB0, HSB1. The block comprises multiple vertical sub-blocks VSB0, VSB1, VSB2. The vertical sub-blocks VSB0, VSB1, VSB2 can also be referred to as "tiers." Each vertical sub-block extends across the block, in one embodiment. Each horizontal sub-block HSB0, HSB1 in the block is a part of vertical sub-block VSB0. Likewise, each horizontal sub-block HSB0, HSB1 in the block is a part of vertical sub-block VSB1. Likewise, each horizontal sub-block HSB0, HSB1 in the block is a part of vertical sub-block VSB2. For ease of explanation, vertical sub-block VSB0 will be referred to as a lower vertical sub-block, vertical sub-block VSB1 will be referred to as a middle vertical sub-block, and VSB2 will be referred to as an upper vertical sub-block. In one embodiment, there are two vertical sub-blocks in a block. In other embodiments, there could be four or more vertical sub-blocks in a block.

A memory operation for a vertical sub-block may be performed on memory cells in one or more horizontal sub-blocks. For example, a programming operation of memory cells in vertical sub-block VSB0 may include: programming memory cells in horizontal sub-block HSB0 but not horizontal sub-block HSB1; programming memory cells in horizontal sub-block HSB1 but not horizontal sub-block HSB0; or programming memory cells in both horizontal sub-block HSB0 and horizontal sub-block HSB1.

The different vertical sub-blocks VSB0, VSB1, VSB2 are treated as separate units for erase/program purposes, in one embodiment. For example, the memory cells in one vertical sub-block can be erased while leaving valid data in the other vertical sub-blocks. Then, memory cells in the erased vertical sub-block can be programmed while valid data remains in the other vertical sub-blocks. In some cases, memory cells in the middle vertical sub-block VSB1 are programmed while there is valid data in the lower vertical sub-block VSB0 and/or the upper vertical sub-block VSB2. Programming the memory cells in middle vertical sub-block VSB1 may present challenges due to the valid data in the other vertical sub-blocks VSB0, VSB2.

Figure 4A:
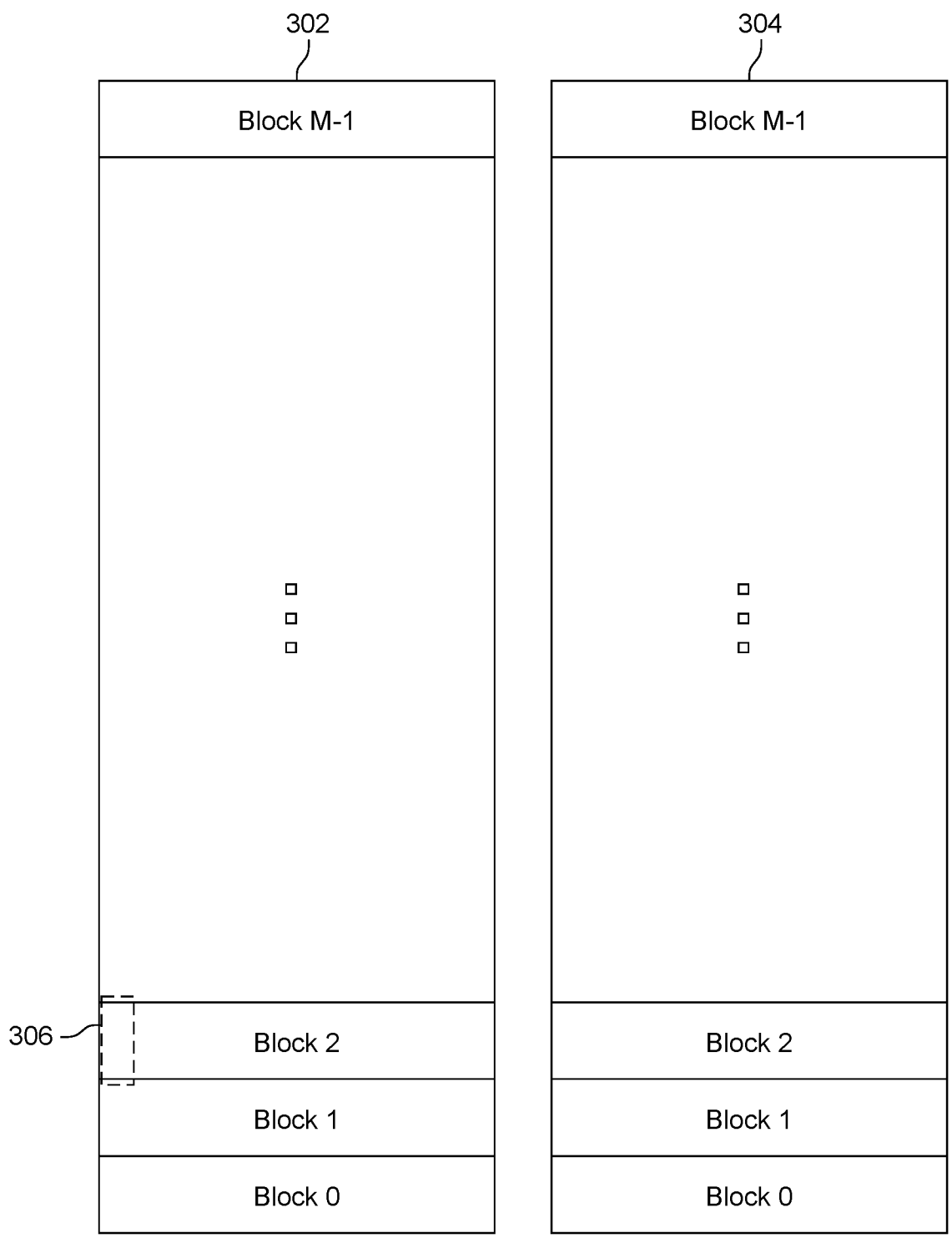
FIG. 4A is a block diagram of an example memory structure having two planes, in connection with which example embodiments of the disclosed technology can be implemented.

FIG. 4A is a block diagram depicting one example organization of memory structure 206, which is divided into two planes 302 and 304. Each plane is then divided into M blocks. In one example, each plane has about 2000 blocks. However, different numbers of blocks and planes can also be used. In one embodiment, a block of memory cells constitutes a single unit for an erase operation. That is, in one embodiment, all memory cells of a block are erased together. In other embodiments, memory cells can be grouped into blocks for other reasons, such as to organize the memory structure 206 to enable the signaling and selection circuits. In some embodiments, a block represents a groups of connected memory cells that share a common set of wordlines.

Figure 4B:
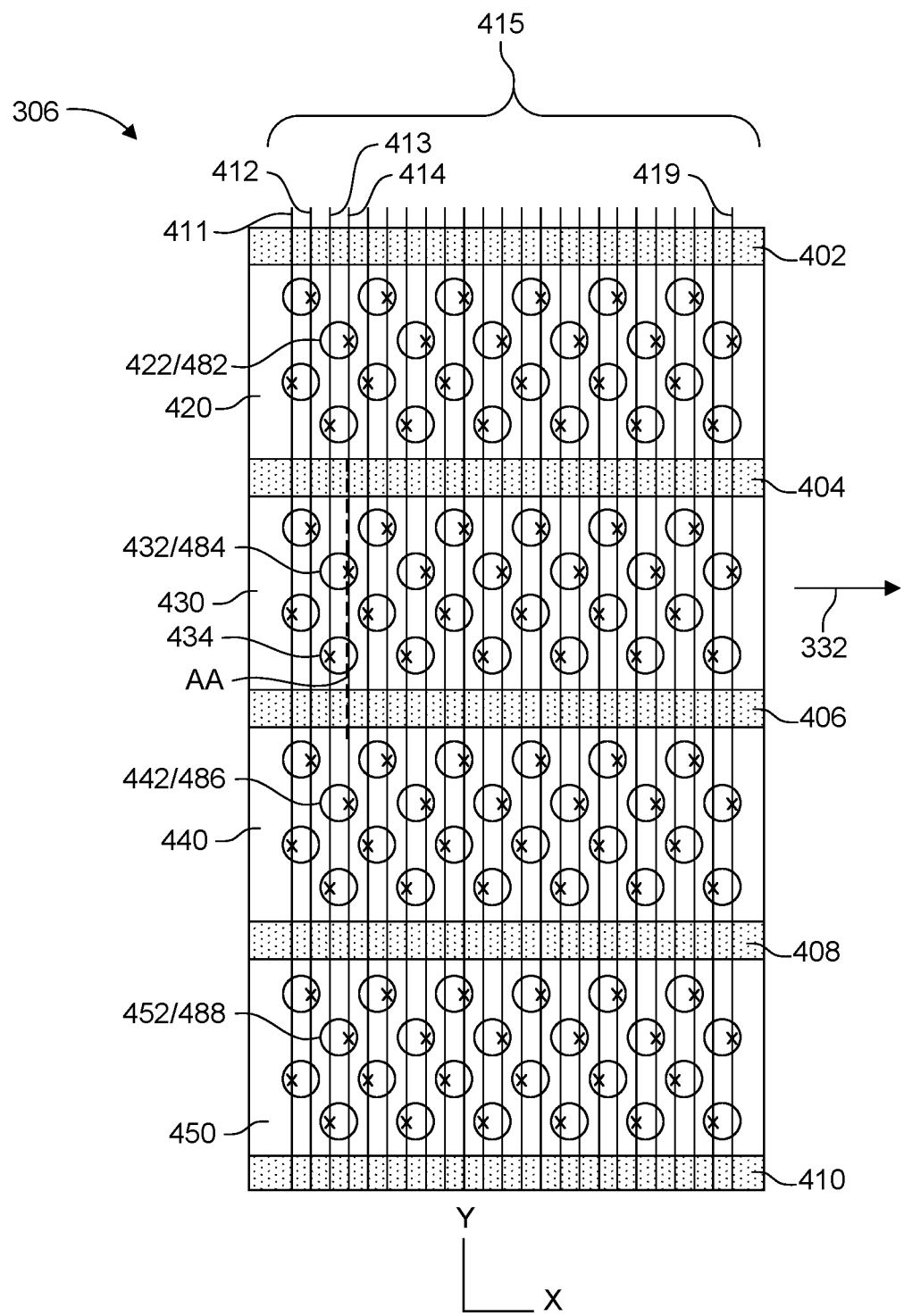
FIG. 4B depicts a top view of a portion of a block of example memory cells, in connection with which example embodiments of the disclosed technology can be implemented.

FIGS. 4B-4F depict an example 3D NAND structure that corresponds to the structure of FIG. 3 and that can be used to implement memory structure 206 of FIGS. 2A and 2B. Although the example memory system of FIGS. 3-4H is a 3D memory structure that includes vertical NAND strings with charge-trapping material, it should be appreciated that other (2D and 3D) memory structures can also be used with the technology described herein. FIG. 4B is a block diagram depicting a top view of a portion of one block from memory structure 206. The portion of the block depicted in FIG. 4B corresponds to portion 306 in block 2 of FIG. 4A. As can be seen from FIG. 4B, the block depicted in FIG. 4B extends in the direction of 332. While in some embodiments, the memory array may have many layers, FIG. 4B illustrates only the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 332, the block includes more vertical columns than depicted in FIG. 4B.

FIG. 4B also depicts a set of bitlines 415, including bitlines 411, 412, 413, 414, . . . 419. FIG. 4B shows twenty-four bitlines because only a portion of the block is depicted. It is contemplated that more than twenty-four bitlines connected to vertical columns of the block. Each of the circles representing vertical columns has an "x" to indicate its connection to one bitline. For example, bitline 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as wordline fingers that are separated by the local interconnects. In one embodiment, the wordline fingers on a common level of a block connect together to form a single wordline. In another embodiment, the wordline fingers on the same level are not connected together. In one example implementation, a bitline only connects to one vertical column in each of regions 420, 430, 440 and 450. In that implementation, each block has sixteen rows of active columns and each bitline connects to four rows in each block. In one embodiment, all of the four rows connected to a common bitline are connected to the same wordline (via different wordline fingers on the same level that are connected together), in which case, the system uses the source side selection lines and the drain side selection lines to choose one (or another subset) of the four to be subjected to a memory operation (program, verify, read, and/or erase).

Although FIG. 4B shows four regions and sixteen rows of vertical columns in a block, with each region having four rows of vertical columns, those exact numbers are an example implementation. Other embodiments may include more or less regions per block, more or less rows of vertical columns per region, and/or more or less rows of vertical columns per block. FIG. 4B also shows the vertical columns being staggered. In other embodiments, different patterns of staggering can be used. In some embodiments, the vertical columns may not be staggered.

Figure 4C:
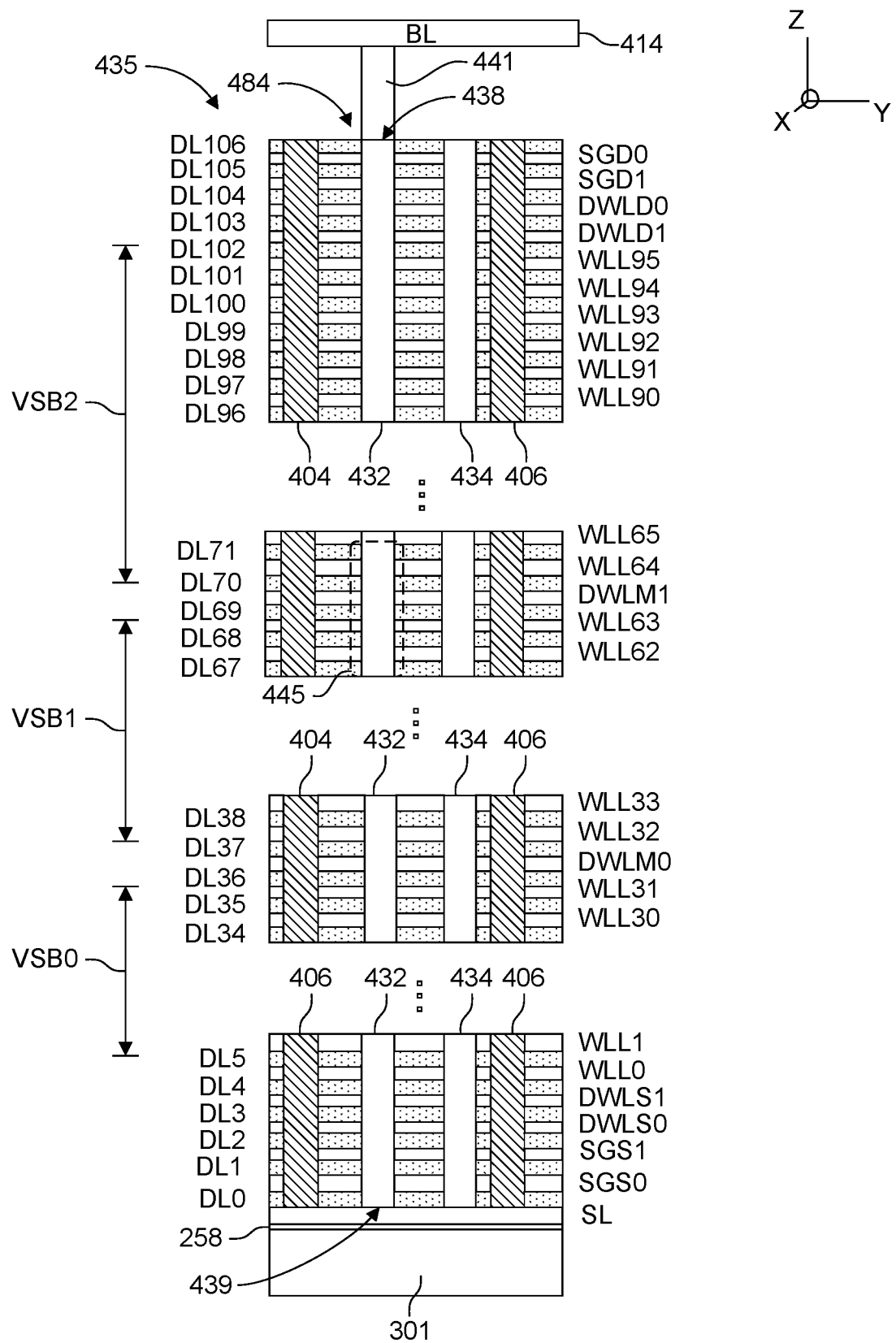
FIG. 4C depicts a stack showing a cross-sectional view along line AA of FIG. 4B.

FIG. 4C depicts an embodiment of a stack 435 showing a cross-sectional view along line AA of FIG. 4B. Two SGD layers (SGD0, SDG1), two SGS layers (SGS0, SGS1) and six dummy wordline layers DWLD0, DWLD1, DWLM1, DWLM0, DWLS0 and DWLS1 are provided, in addition to the data wordline layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 301, an insulating film 250 on the substrate, and a portion of a source line SL. A portion of the bitline 414 is also depicted. Note that NAND string 484 is connected to the bitline 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bitline 414. The metal-filled slits 404 and 406 from FIG. 4B are also depicted.

The stack 435 is divided into three vertical sub-blocks (VSB0, VSB1, VSB2). Vertical sub-block VSB0 includes WLL0-WLL31. Layers SGS0, SGS1, DWLS0, DWLS1 could also be considered to be a part of vertical sub-block VSB0. Vertical sub-block VSB1 includes WLL32-WLL63. Layers SGD0, SGD1, DWLD0, DWLD1 could also be considered to be a part of vertical sub-block VSB2. Vertical sub-block VSB2 includes WLL64-WLL95. Each NAND string has a set of data memory cells in each of the vertical sub-blocks. Dummy wordline layer DMLM0 is between vertical sub-block VSB0 and vertical sub-block VSB1. Dummy wordline layer DMLM1 is between vertical sub-block VSB1 and vertical sub-block VSB2. The dummy wordline layers have dummy memory cell transistors that may be used to electrically isolate a first set of memory cell transistors within the memory string (e.g., corresponding to vertical sub-block VSB0 wordlines WLL0-WLL31) from a second set of memory cell transistors within the memory string (e.g., corresponding to the vertical sub-block VSB1 wordlines WLL32-WLL63) during a memory operation (e.g., an erase operation or a programming operation).

In another embodiment, one or more middle junction transistor layers are used to divide the stack 435 into vertical sub-blocks. A middle junction transistor layer contains junction transistors, which do not necessarily contain a charge storage region. Hence, a junction transistor is typically not considered to be a dummy memory cell. Both a junction transistor and a dummy memory cell may be referred to herein as a "non-data transistor." A non-data transistor, as the term is used herein, is a transistor on a NAND string, where the transistor is either configured to not store user or system data or operated in such a way that the transistor is not used to store user data or system data. A wordline that is connected to non-data transistors is referred to herein as a non-data wordline. Examples of non-data wordlines include, but are not limited to, dummy wordlines, a select line in a middle junction transistor layer, or the like.

The stack 435 may have more than three vertical sub-blocks. For example, the stack 435 may be divided into four, five, or more vertical sub-blocks. Each of the vertical sub-blocks may contain at least one data memory cell. In some embodiments, additional layers similar to the middle dummy wordline layers DWLM may be provided to divide the stack 435 into the additional vertical sub-blocks. In one embodiment, the stack has two vertical sub-blocks.

Figure 4D:
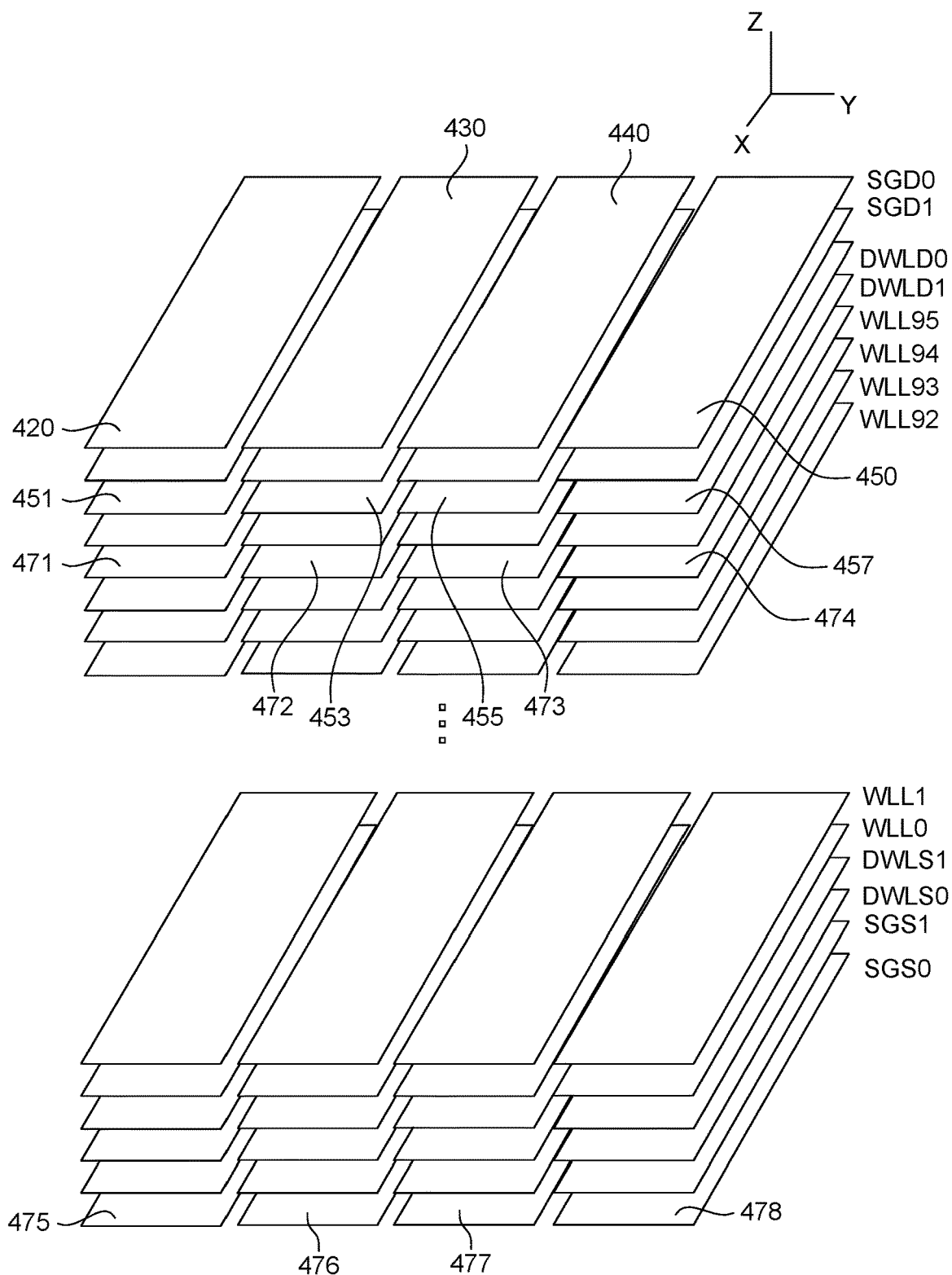
FIG. 4D depicts an alternative view of the select gate layers and wordline layers of the stack of FIG. 4C.

FIG. 4D depicts an alternative view of the SG layers and wordline layers of the stack 435 of FIG. 4C. Each of SGD layers SGD0 and SGD0 (the drain side SG layers) includes parallel rows of SG lines associated with the drain side of a set of NAND strings. For example, SGD0 includes drain side SG regions 420, 430, 440 and 450, consistent with FIG. 4B. Below the SGD layers are the drain side dummy wordline layers. In one implementation, each dummy wordline layer represents a wordline that is connected to a set of dummy memory cells at a given height in the stack. For example, DWLD0 includes wordline layer regions 451, 453, 455 and 457. A dummy memory cell, also referred to herein as a non-data memory cell, does not store data and is ineligible to store data, while a data memory cell is eligible to store data. Moreover, the threshold voltage Vth of a dummy memory cell is generally fixed at the time of manufacture or may be periodically adjusted, while the Vth of the data memory cells changes more frequently, e.g., during erase and programming operations of the data memory cells.

Below the dummy wordline layers are the data wordline layers. For example, WLL95 comprises wordline layer regions 471, 472, 473 and 474. Below the data wordline layers are the source side dummy wordline layers. Below the source side dummy wordline layers are the SGS layers. Each of the SGS layers SGS0 and SGS1 (the source side SG layers) includes parallel rows of SG lines associated with the source side of a set of NAND strings. For example, SGS0 includes source side SG lines 475, 476, 477 and 478. In some embodiments, each SG line is independently controlled, while in other embodiments, the SG lines are connected and commonly controlled.

Figure 4E:
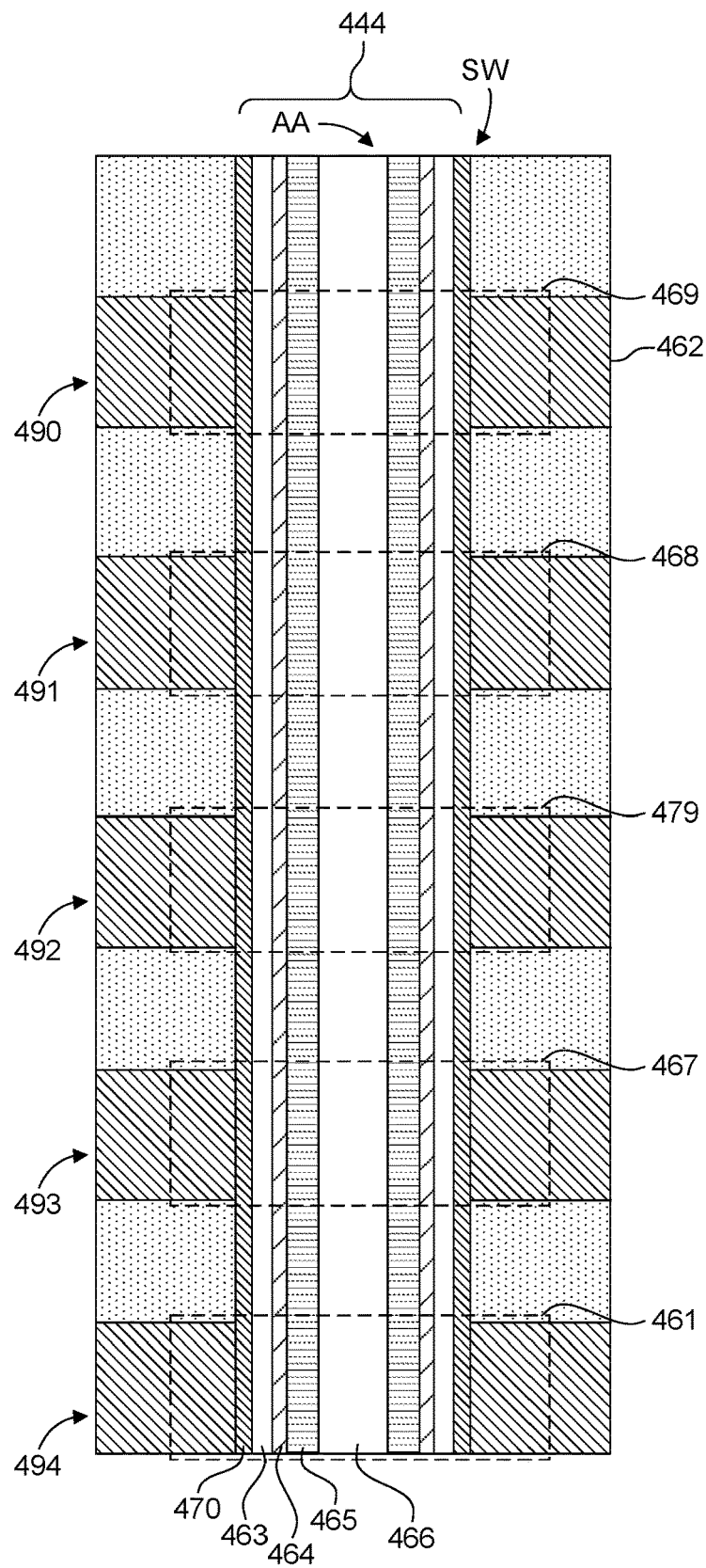
FIG. 4E depicts a view of a region of FIG. 4C.

FIG. 4E depicts a view of the region 445 of FIG. 4C. Data memory cell transistors 469 and 468 are above dummy memory cell transistor 479. Below dummy memory cell transistor 479 are data memory cell transistors 467 and 461. A number of layers can be deposited along the sidewall (SW) of the memory hole 444 and/or within each wordline layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A wordline layer can include a conductive metal 462 such as tungsten as a control gate. For example, control gates 490, 491, 492, 493 and 494 are provided. In this example, all of the layers except the metal are provided in the memory hole. In other approaches, some of the layers may be in the control gate layer. Additional pillars can be similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Non-data transistors (e.g., select transistors, dummy memory cell transistors) may also include the charge trapping layer 463. For example, in FIG. 4E, dummy memory cell transistor 479 includes the charge trapping layer 463. Thus, the Vth of at least some non-data transistors may also be adjusted by storing or removing electrons from the charge trapping layer 463. However, it is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer, and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4F:
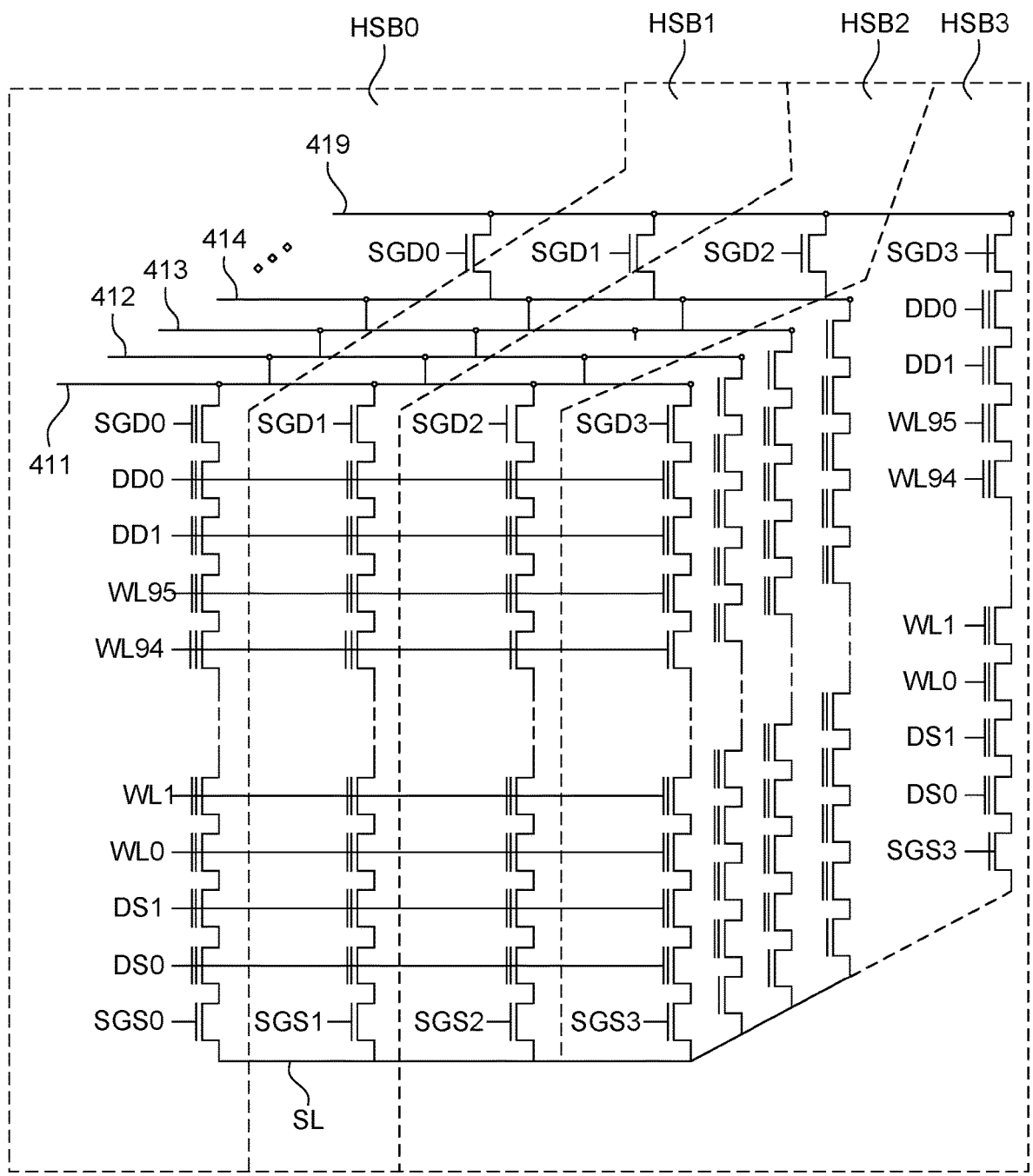
FIG. 4F is a schematic of a plurality of example NAND strings showing multiple horizontal sub-blocks, in connection with which example embodiments of the disclosed technology can be implemented.

FIG. 4F is a schematic diagram of a portion of the memory depicted in FIGS. 3-4E. FIG. 4F shows physical wordlines WLL0-WLL95 running across the entire block. The structure of FIG. 4F corresponds to portion 306 in Block 2 of FIGS. 4A-E, including bitlines 411, 412, 413, 414, . . . 419. Within the block, each bitline is connected to four NAND strings. Drain side selection lines SGD0, SGD1, SGD2 and SGD3 are used to determine which of the four NAND strings connect to the associated bitline(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, horizontal sub-block HSB1 corresponds to those vertical NAND strings controlled by SGD1 and SGS1, horizontal sub-block HSB2 corresponds to those vertical NAND strings controlled by SGD2 and SGS2, and horizontal sub-block HSB3 corresponds to those vertical NAND strings controlled by SGD3 and SGS3. FIG. 4G is a schematic of horizontal sub-block HSB0. Horizontal sub-blocks HSB1, HSB2 and HSB3 may have similar structures. FIG. 4G shows physical wordlines WL0-WL95 running across the entire sub-block HSB0. All of the NAND strings of sub-block HSB0 are connected to SGD0 and SGS0. For ease of depiction, FIG. 4G only depicts six NAND strings 494, 495, 496, 497, 498, and 499; however, horizontal sub-block HSB0 may have thousands of NAND strings (e.g., 15,000 or more).

Figure 4G:
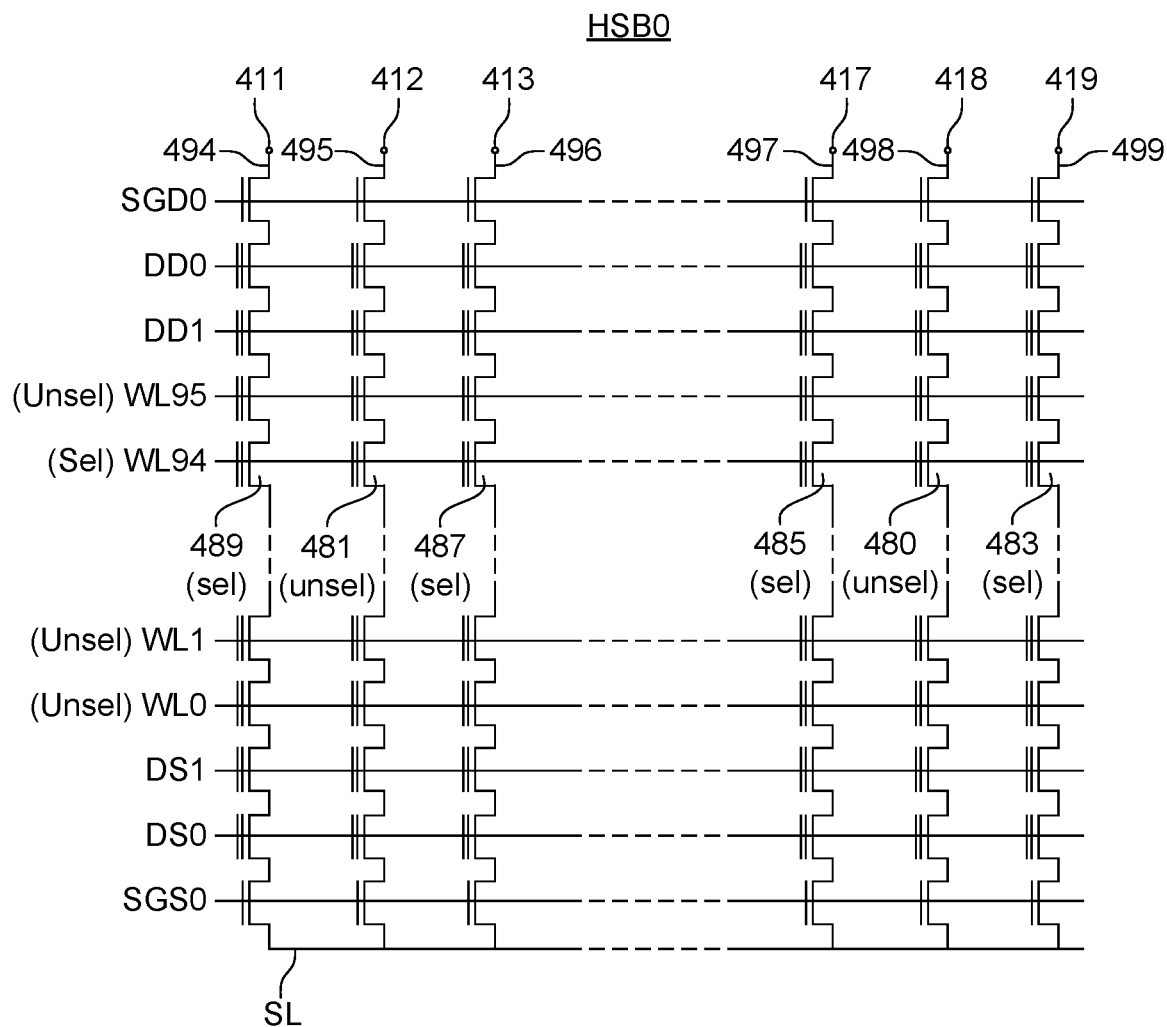
FIG. 4G is a schematic of a plurality of NAND strings showing one example horizontal sub-block, in connection with which example embodiments of the disclosed technology can be implemented.
Figure 4H:
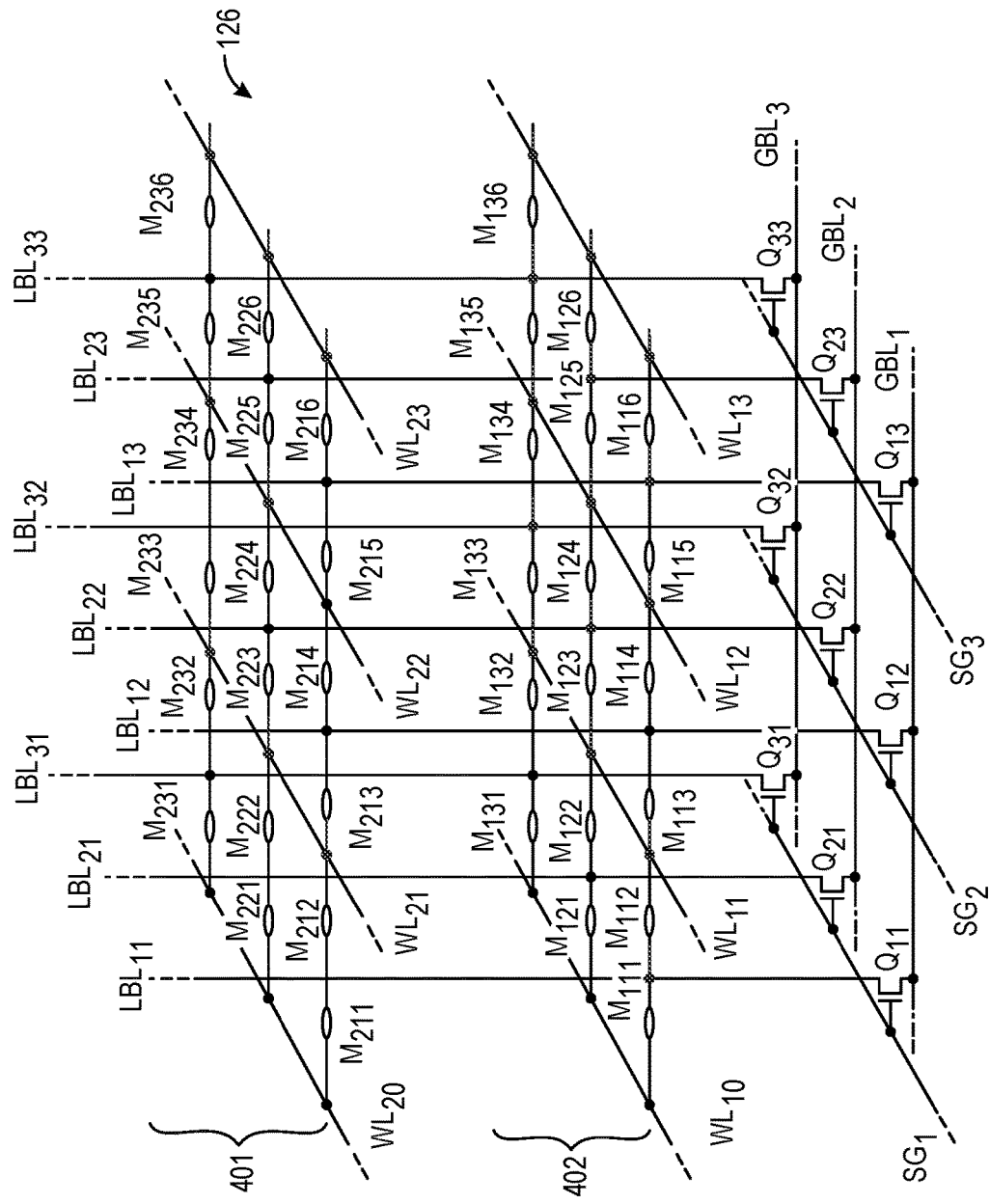
FIG. 4H depicts various embodiments of a portion of a three-dimensional memory array with a vertical cross-point structure, in connection with which example embodiments of the disclosed technology can be implemented.

FIG. 4G is a schematic of horizontal sub-block HSB0. Horizontal sub-blocks HSB1, HSB2 and HSB3 may have similar structures. FIG. 4G shows physical wordlines WL0-WL95 running across the entire sub-block HSB0. All of the NAND strings of sub-block HSB0 are connected to SGD0 and SGS0. For ease of depiction, FIG. 4G only depicts six NAND strings 494, 495, 496, 497, 498, and 499; however, horizontal sub-block HSB0 may have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells, while the memory cells that are not intended to take on a new electrical characteristic (or other characteristic) to reflect a changed programming state are referred to as the unselected memory cells. In certain situations, unselected memory cells may be connected to the same wordline as selected memory cells. Unselected memory cells may also be connected to different wordlines than selected memory cells. Similarly, during a reading process, the set of memory cells to be read are referred to as the selected memory cells, while the memory cells that are not intended to be read are referred to as the unselected memory cells.

To better understand the concept of selected memory cells and unselected memory cells, assume a programming operation is to be performed and, for example purposes only, that wordline WL94 and horizontal sub-block HSB0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HSB0 are selected memory cells and some of the memory cells connected to WL94 in horizontal sub-block HSB0 are unselected memory cells depending on how the programming operation is performed and the data pattern being programmed. For example, those memory cells that are to remain in the erased state (e.g., state S0) will be unselected memory cells because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 481 and 480 (which are connected to wordline WL94) are to remain in the erased state; therefore, memory cells 481 and 480 are unselected memory cells (labeled unsel in FIG. 4G). Additionally, assume, for example purposes, that memory cells 489, 487, 485 and 483 (which are connected to wordline WL94) are each to be programmed to a respective one of data states S1-S7; therefore, memory cells 489, 487, 485 and 483 are selected memory cells (labeled sel in FIG. 4G).

FIG. 4H illustrates another memory structure that can be used for the structure 126 of FIG. 1. FIG. 4H illustrates a three-dimensional vertical cross-point structure, the wordlines still run horizontally, with the bitlines oriented to run in a vertical direction.

FIG. 4H depicts one embodiment of a portion of a monolithic three-dimensional memory array structure 126 that includes a first memory level 402 positioned below a second memory level 401. As depicted, the local bitlines LBL11-LBL33 are arranged in a first direction (e.g., a vertical direction) and the wordlines WL10-WL23 are arranged in a second direction perpendicular to the first direction. This arrangement of vertical bitlines in a monolithic three-dimensional memory array is one embodiment of a vertical bitline memory array. As depicted, disposed between the intersection of each local bitline and each wordline is a particular memory cell (e.g., memory cell M111 is disposed between local bitline LBL11 and wordline WL10). This structure can be used with a number of different memory cell structures. In one example, the particular memory cell may include a floating gate device or a charge trap device (e.g., using a silicon nitride material). In another example, the particular memory cell may include a reversible resistance-switching material, a metal oxide, a phase change memory (PCM) material, or a ReRAM material. The global bitlines GBL1-GBL3 are arranged in a third direction that is perpendicular to both the first direction and the second direction. A set of bitline select devices (e.g., Q11-Q31), such as a vertical thin film transistor (VTFT), may be used to select a set of local bitlines (e.g., LBL11-LBL31). As depicted, bitline select devices Q11-Q31 are used to select the local bitlines LBL11-LBL31 and to connect the local bitlines LBL11-LBL31 to the global bitlines GBL1-GBL3 using row select line SG1. Similarly, bitline select devices Q12-Q32 are used to selectively connect the local bitlines LBL12-LBL32 to the global bitlines GBL1-GBL3 using row select line SG2 and bitline select devices Q13-Q33 are used to selectively connect the local bitlines LBL13-LBL33 to the global bitlines GBL1-GBL3 using row select line SG3.

Referring to FIG. 4H, as only a single bitline select device is used per local bitline, only the voltage of a particular global bitline may be applied to a corresponding local bitline. Therefore, when a first set of local bitlines (e.g., LBL11-LBL31) is biased to the global bitlines GBL1-GBL3, the other local bitlines (e.g., LBL12-LBL32 and LBL13-LBL33) must either also be driven to the same global bitlines GBL1-GBL3 or be floated. In one embodiment, during a memory operation, all local bitlines within the memory array are first biased to an unselected bitline voltage by connecting each of the global bitlines to one or more local bitlines. After the local bitlines are biased to the unselected bitline voltage, then only a first set of local bitlines LBL11-LBL31 are biased to one or more selected bitline voltages via the global bitlines GBL1-GBL3, while the other local bitlines (e.g., LBL12-LBL32 and LBL13-LBL33) are floated. The one or more selected bitline voltages may correspond with, for example, one or more read voltages during a read operation or one or more programming voltages during a programming operation.

Figure 5:
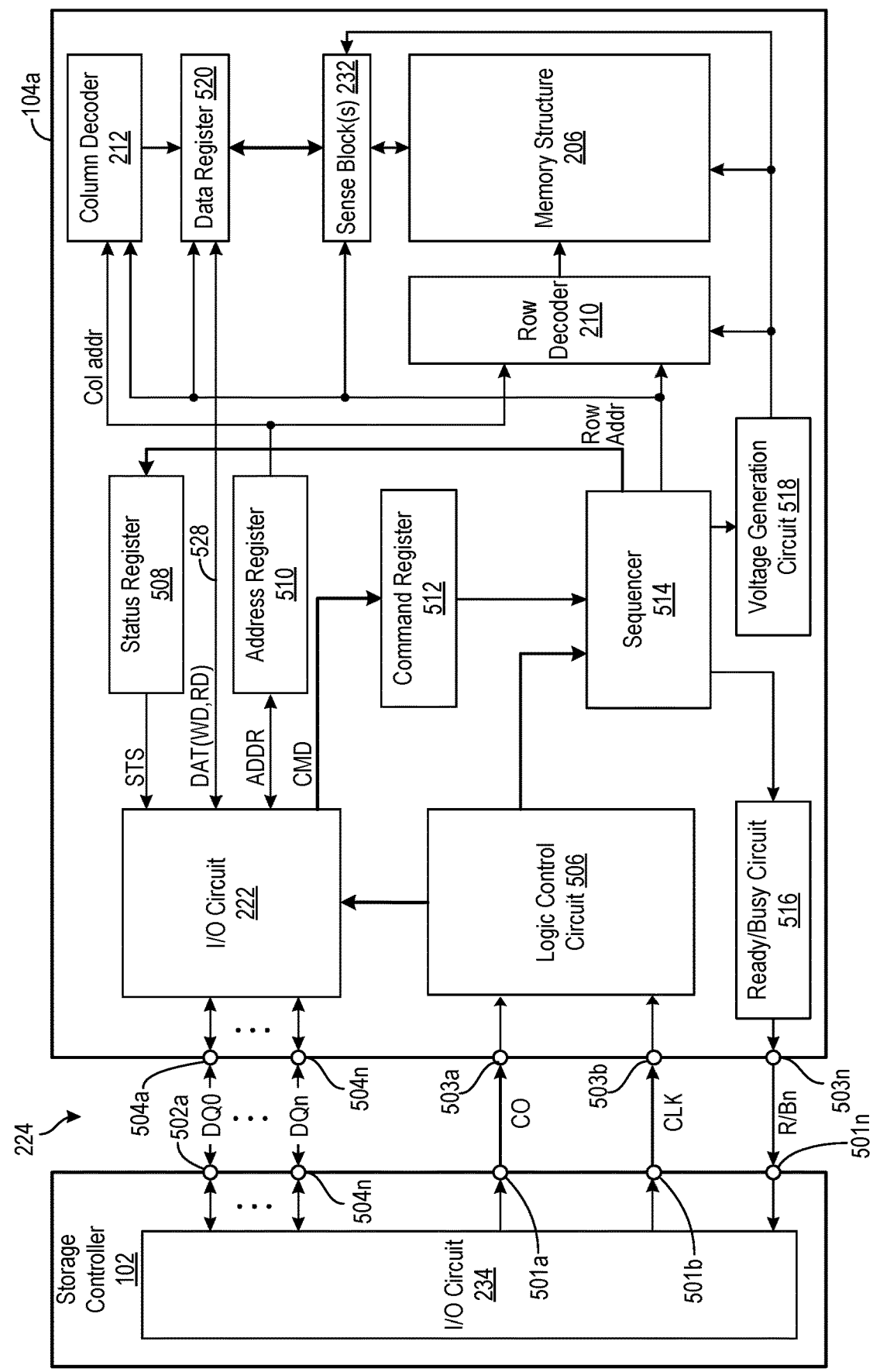
FIG. 5 is a block diagram of example memory system that depicts more details of an example embodiment of memory die, in connection with which example embodiments of the disclosed technology can be implemented.

FIG. 5 is a block diagram of example memory system 500 that depicts more details of an embodiment of memory die 104a. With reference to FIG. 2B above, the memory die 104a is connected to the storage controller 102 via a memory interface 224 and operates based on commands from the storage controller 102. For example, the memory die 104a transmits and receives one or more data signals (referred to herein as "DQ signals") to and from the storage controller 102 via data bus 228 of the memory interface 224. The one or more DQ signals may be an n-bit wide signal where each data signal is a 1-bit wide signal. For example, n may be 7, thus the DQ signal may be an 8-bit wide signal. The DQ signals may be encoded with input/output (I/O) data. For example, data in (DIN) and data out (DOUT) for data operations (e.g., read operations, write operations, etc.) address data (e.g., address codes) for address sequencing for the data operations, and/or command data (e.g., command codes) for command sequencing for the data operations.

Data sent over the DQ signals can be latched with respect to a rising edge or a falling edge of a clock (CLK) signal. The CLK signal, in various examples, can include a pair of complementary CLK signals, such as a DQS (e.g., data strobe signal) and DQSB (e.g., inverse data strobe signal). The DQSB CLK signal is the logical inverse of the DQS CLK signal. The DQSB CLK signal is added for redundancy since rising and falling edges of one signal may be distorted during transmission. DQ data can be latched on either or both of the rising and falling edges of the CLK signal to achieve a double data rate.

The memory die 104a also receives control (CO) signals such as, but not limited to, chip enable (CEn) signal, command latch enable (CLE) signal, address latch enable (ALE) signal, write enable (WEn) signal, and read enable (REn) signal from the storage controller 102 via the control bus 226 of the memory interface 224. The memory die 104a also transmits control signals, for example but not limited to, a ready/busy signal (R/Bn) to the storage controller 102. In some embodiments, each of CO signals may be a one-bit wide signal. In other embodiments, the control signals CO signals may have other bit-widths as desired.

The storage controller 102 issues a command code to perform a read operation, a command code to perform a write operation, or the like to the memory die 104a in response to a command from a host device (e.g., host device 106 and/or 112). The storage controller 102 manages the memory space of the memory die 104a. As part of the read or write operation, the storage controller 102 issues various commands to perform for a respective operation and the memory die 104a and/or storage controller 102 transmit DIN/DOUT to complete the respective operation.

Storage controller 102 comprises I/O circuit 234 electrically connected to the I/O circuit 222 of the memory die 104a via a plurality of electrical contacts or terminals. The electrical contacts may comprise pads, pins, etc., for electrically connecting the memory die 104a to the storage controller 102 via a respective bus of the memory interface 224. For example, the storage controller 102 includes a plurality of data I/O contacts 502a-n electrically connected to a plurality of data I/O contacts 504a-n of the memory die 104a. Storage controller 102 also includes a plurality of command I/O contacts 501a-n electrically connected to a plurality of command I/O contacts 503a-n of the memory die 104a. The I/O circuit 234 transmits the CO signals and CLK signal to the memory die 104a over the control bus 226 of the memory interface 224 via respective pins and transmits DQ signals (e.g., DIN data signals) over the data bus 228 of the memory interface 224 via respective pins. The I/O circuit 222 can transmit the R/Bn signal to the storage controller 102 over the control bus 226 and the DQ signals (e.g., DOUT data signals) over the data bus 228 via respective pins.

As illustrated in FIG. 5, the memory die 104a includes I/O circuit 222, a logic control circuit 506, a status register 508, an address register 510, a command register 512, a sequencer 514, a ready/busy circuit 516, a voltage generation circuit 518, and a data register 520. The various components 506-520 may be included as part of the die controller 204, for example, as part of the control circuit 214 and/or decoder circuit 216. FIG. 5 also illustrates the memory structure 206, row decoder 210, a sense blocks 232, and column decoder 212, as described above in connection with FIG. 2A.

The I/O circuit 222 controls input and output of the DQ signals to and from the storage controller 102. For example, in the case of a write operation, the I/O circuit 222 transmits data received from the storage controller 102 as DIN to data register 520, transmits an address code to the address register 510, and transmits a command code to the command register 512. The I/O circuit 222 also transmits status information STS received from the status register 508, data received from the data register 520 to be transmitted to the storage controller 102 as DOUT, and an address code received from the address register 510 to the storage controller 102. STS, DOUT, and the address are transmitted as DQ signals encoded with a data pattern according to bits from memory structure 206 for the STS, DOUT, or address. The I/O circuit 222 and the data register 520 are connected via an internal data bus 528. For example, the internal data bus 528 includes a plurality internal data lines (e.g., IO0 to IO7 corresponding to 8-bit DQ signals such as DQ [0:7]). The number of data lines is not limited to eight, but may be set to 16, 32, or any number.

The logic control circuit 506 receives, for example, the CEn signal, the CLE signal, the ALE signal, the WEn signal, and the REn signal from the storage controller 102 via control bus 226. Then logic control circuit 506 controls the I/O circuit 222 and the sequencer 514 in accordance with a received signal.

The status register 566 temporarily stores status information STS, for example, in a write operation, a read operation, and an erasing operation for data and notifies the storage controller 102 when the operation normally ends.

The address register 510 temporarily stores the address code received from the storage controller 102 via the I/O circuit 222. For example, the I/O circuit 222 may detect DQ signals and sample the DQ signals according to the CLK signal to obtain a bit pattern encoded thereon. The I/O circuit 222 may then decode the bit pattern to obtain the data, which in this example may be an address code. The address code is then temporarily stored in the address register 510. Then the address register 510 transmits a row address (row addr) to the row decoder 210 and transmits a column address (col addr) to the column decoder 212. In various embodiments, the address code may include row and column, as well as a wordline selection, memory block selection, memory string selection, plane selection, and die selection. Each is transmitted by the address register 510 to the row decoder 210 and/or the column decoder 212.

The command register 512 temporarily stores the command code received from the storage controller 102 via the I/O circuit 222 and transmits the command code to the sequencer 514. For example, the I/O circuit 222 may detect DQ signals and sample the DQ signals according to the CLK signal to obtain a bit pattern encoded thereon. The I/O circuit 222 may then decode the bit pattern to obtain the data, which in this example may be a command code. The command code is then temporarily stored in the command register 512.

The sequencer 514 controls operation of the memory die 104a. For example, the sequencer 514 controls the status register 508, the ready/busy circuit 516, the voltage generation circuit 518, the row decoder 210, the sense blocks 232, the data register 520, the column decoder 212, and the like according to a command code stored in the command register 512 to execute the write operation, the read operation, and the erasing operation according to the code.

The ready/busy circuit 516 transmits the R/Bn signal to the storage controller 102 according to an operation state of the sequencer 514. For example, the R/Bn signal is transmitted to the storage controller 102 via the control bus 226 of the memory interface 224.

The voltage generation circuit 518 generates a voltage necessary for an operation (e.g., a write operation, a read operation, or an erasing operation) according to control of the sequencer 514. The voltage generation circuit 518 supplies the generated voltage, for example, to the memory structure 206, the row decoder 210, and the sense blocks 232. The row decoder 210 and the sense blocks 232 apply a voltage supplied from the voltage generation circuit 518 to memory cells in the memory structure 206. The voltage generation circuit 518 may be an example of the power control circuit 215 of FIG. 2A. Details of the memory structure 206 are provided in connection with FIGS. 3-4H above.

The data register 520 includes a plurality of latch circuits. The latch circuits store the write data WD and the read data RD. For example, in a write operation, the data register 520 temporarily stores the write data WD received from the I/O circuit 222 and transmits the write data WD to the sense blocks 232. For example, in a read operation, the data register 520 temporarily stores the read data RD received from the sense blocks 232 and transmits the read data RD to the I/O circuit 222.

Figure 6A:
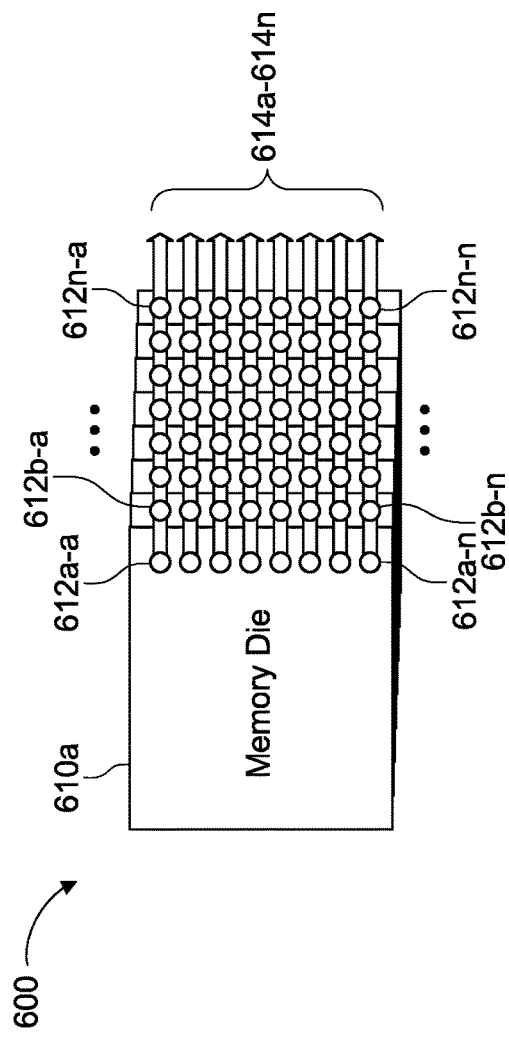
FIGS. 6A and 6B are schematic block diagrams of an example memory array 600.
Figure 6B:
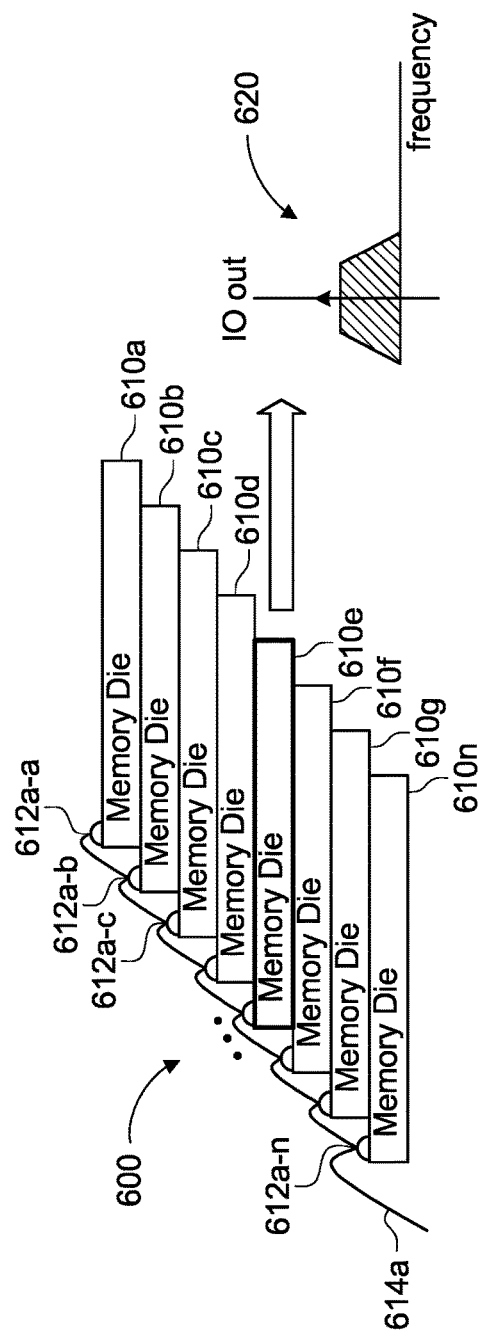

FIGS. 6A and 6B are schematic block diagrams of an example memory array 600. FIG. 6A is a top down view memory array 600 and FIG. 6B is a side view of memory array 600. Similar to memory array 202 of FIG. 2A, memory array 600 comprises a number of memory dies 610a-n (collectively referred to herein as memory dies 610) that are connected to a storage controller (not shown in FIG. 6, but as shown in FIGS. 2A, 2B, and 5) via a memory interface 224. In the illustrative example of FIG. 6, memory array 600 comprises eight memory dies 610. Memory dies 610 are shown as stack of memory dies 610. The number of memory dies 610 is not limited to eight, but may be 2, 3, 4, 16, 32, or any number of memory dies.

Each memory die 610 comprises a plurality data I/O contacts, as described with regard to FIG. 5, that electrically contact each memory die 610 to a plurality of data I/O lines of a data bus (e.g., data bus 228). The data I/O lines may be example implementations of data lines over which DQ signals DQ[n:0] can be exchanged. In the illustrative example of FIG. 6, memory die 610a comprises data I/O contacts 612a-a through 612a-n, memory die 610b comprises data I/O contacts 612b-a through 612b-n, and so on until memory die 610n comprises data I/O contacts 612n-a through 612n-n. Collectively, data I/O contacts will be referred to as data I/O contacts 612. The data bus comprises a plurality of data I/O lines 614a-614n, each of which is connected to a data I/O contact 612 of each memory die 610. That is, for example, data I/O line 614a is connected to data I/O contacts 612a-a of memory die 610a, to data I/O contacts 612a-b of memory die 610b, and so on until to data I/O contacts 612n-a of memory die 610n. Similarly, data I/O line 614b is connected to data I/O contacts 612a-b of memory die 610a, to data I/O contacts 612b-b of memory die 610b, and so on until to data I/O contacts 612n-b of memory die 610n. This pattern is continued for each data I/O line 614 as shown in FIG. 6A. FIG. 6B illustrates the serial connection of each memory die 610 to data I/O line 614a via the data I/O contacts 612a-a to 612n-a. In an illustrative implementation, each data I/O line 614 can be wire bonded to respective data I/O contacts 612 to form a physical interconnect therewith. Other methods, as known in the art, may also be utilized for creating a direct physical interconnect between data I/O lines 614 and data I/O contacts 612.

Each memory die 610 may be similar to memory die 104a described above in connection with FIGS. 1-5. Thus, DQ signals comprising data patterns encoded with I/O data, such as DIN data for a write operation, may be received at the data I/O contacts 612 from the storage controller via data I/O lines 614 and detected by an I/O circuit (e.g., I/O circuit 222). The memory die 610 then decodes the data pattern to obtain bit values of the DIN data, which can be written to the memory structure 206, as described above in connection with FIG. 5. Similarly, the memory die 610 may obtain bit values for DOUT data, in the case of a read operation, which can be encoded into DQ signal as a data pattern. The memory die 610 can then transmit the DQ signal to a storage controller via data I/O lines 614. Further, while not shown in FIG. 6, each memory die 610 may also comprise command I/O contacts, such as command I/O contacts 503 described in connection with FIG. 5, that connect to a control bus, such as control bus 226.

As described above, each data I/O line 614 is serially connected to each memory die 610 via respective data I/O contacts 612. As a result, each data I/O line 614 may be considered a shared data I/O line because a given data I/O line is shared by (e.g., connected to) each memory die. Conventionally, as a result of this shared configuration of the data I/O lines, only one memory die 610 can be active at one time on a single data I/O line. That is, only one memory die 610 can be selected for a data transfer, either as transfer in (e.g., write operation) or transfer out (e.g., read operation), such that only one memory die 610 can detect a DQ signal on or supply a DQ signal onto a shared data I/O line 614 at a given instant in time. Further, since only one memory die 610 can be active at a time, the other memory dies cannot transfer data on the shared data I/O line that is occupied by the active memory die 610.

The limitation of a single memory die 610 being active on a shared data I/O line at a time is because DQ singles transferred to or from the storage controller are generally multiplexed in the time domain. That is, I/O data on the shared data I/O line 614 is separated in by temporal spacing in the time domain. As a result, only one memory die 610 can transfer data at a given point in time, and all other memory dies 610 must wait for that operation to be completed before data transfer to another memory die 610 can occur. Thus, data I/O throughput is bottlenecked to the throughput of the memory die 610, such that total I/O throughput is one times the memory die throughput. That is, even though I/O data from a storage controller may be provided over a data bus 226 capable of highspeed I/O, if this highspeed I/O transfer rate exceeds the throughput of the individual memory dies, the total throughput of the device is limited to that of the memory die regardless of the transfer rate from the data bus 226.

FIG. 6B depicts a graphical representation of a I/O data throughput by memory array 600. In this example, memory die 610e may be transferring I/O data 620 multiplexed in the time domain. FIG. 6B illustrates the I/O data 620 plotted in the frequency domain. Since the data I/O line is shared between the plurality of memory dies 610, only memory die 610e can be operated and the maximum total I/O throughput is the I/O throughput of the memory die.

Figure 7A:
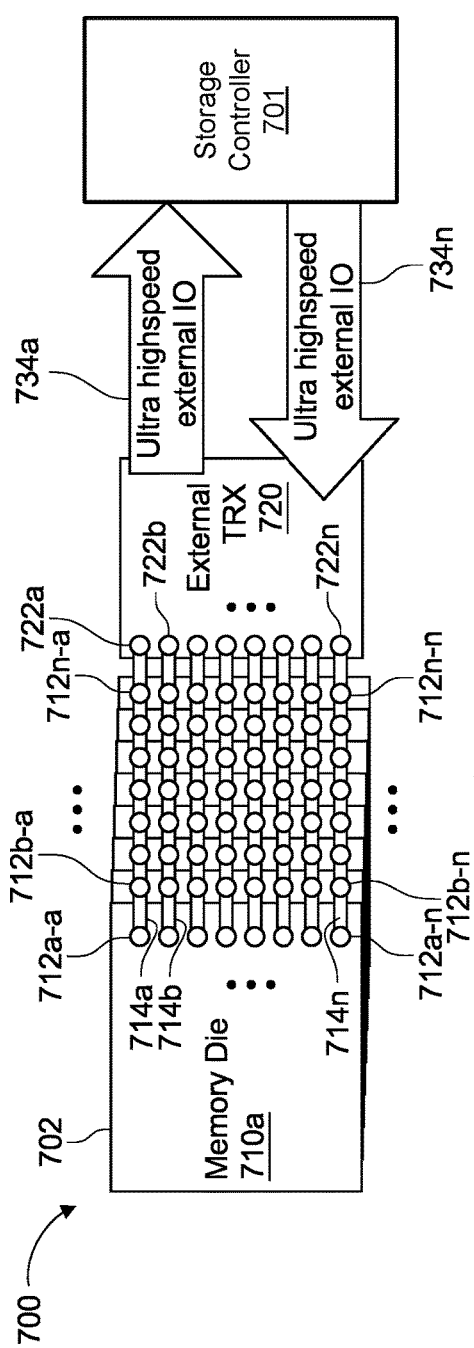
FIGS. 7A and 7B are schematic block diagrams of an example memory system 700, in accordance with embodiments of the disclosed technology.
Figure 7B:
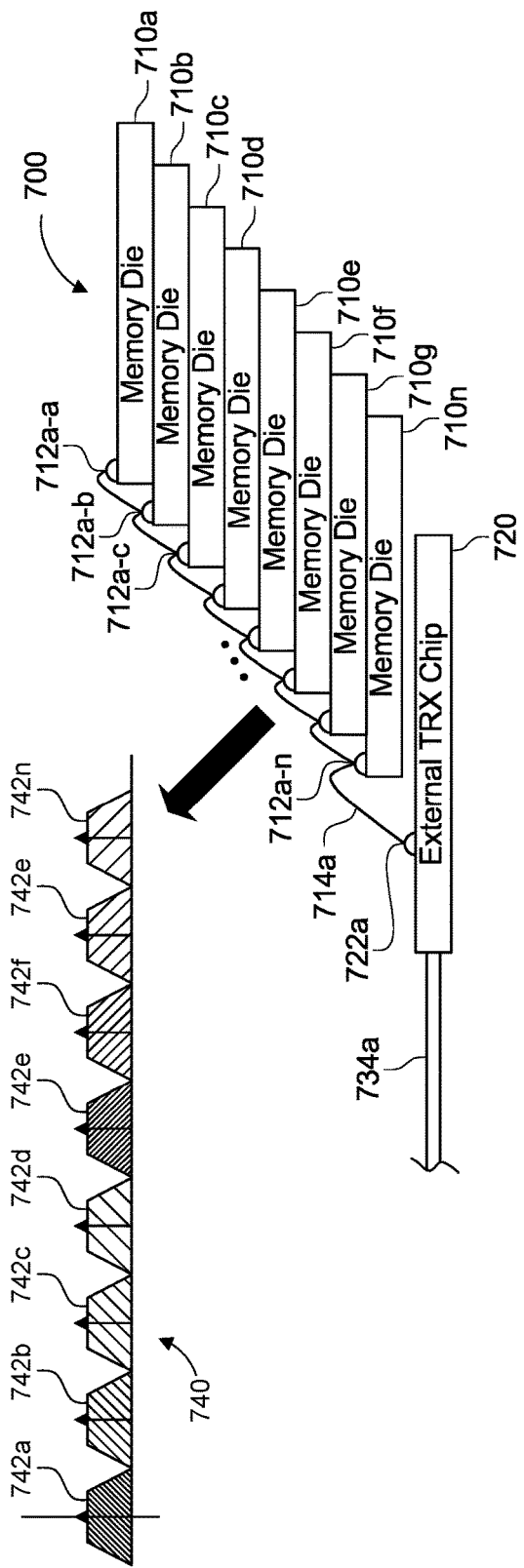

FIGS. 7A and 7B are schematic block diagrams of an example memory system 700, in accordance with embodiments of the disclosed technology. FIG. 7A is a top-down view memory system 700 and FIG. 7B is a side view of memory system 700.

The memory system 700 comprises a memory array 702 connected to storage controller 701 via a memory interface (e.g., memory interface 224). The storage controller may be substantially similar to storage controller 102 as described above in connection with FIGS. 1-6. The memory array 702 may be similar to memory array 600 of FIG. 6 except as provided herein. That is, memory array 702 comprises a number of memory dies 710a-n (collectively referred to herein as memory dies 710) that are electrically connected to plurality of data I/O lines 714a-714n using a plurality of data I/O contacts 712a-a through 712n-n, as described above in connection with FIG. 6. Thus, similar to the memory array 600 of FIG. 6, the memory dies 710 are interconnected via shared data I/O lines 714. In the illustrative example of FIGS. 7A and 7B, memory system 700 comprises eight memory dies 710; however, the number of memory dies 710 is not limited to eight, and may be any number of memory dies (e.g., 2, 3, 4, 16, 32, etc.).

Memory system 700 also comprises a modulation circuit 720 connected between the memory array 702 and the storage controller 701. In an illustrative embodiment, modulation circuit 720 can be provided at a memory interface, such as memory interface 224 of FIG. 2A. In the example of FIGS. 7A and 7B, modulation circuit 720 comprises data I/O contract 722a-722n that electrically connect the modulation circuit 720 to the memory array 702 via the data I/O lines 714. That is, each data I/O line 714a-714n is connected to a data I/O pin 722a-722n on the modulation circuit 720. Modulation circuit 720 is also connected to storage controller 701 via a data I/O lines 734a-734n. As such, data I/O lines 714a-714n may be referred to as first data I/O line 714 and data I/O lines 734a-734n may be referred to as second data I/O lines 734. In one example, data I/O lines 734 may represent a data bus 228 of memory interface 224. In another example, modulation circuit 720 may be positioned within the memory interface 224, thereby partitioning the data bus 228 into a first data bus comprising data I/O lines 714 and a second data bus comprising data I/O lines 734. In any case, data I/O lines 714 may be substantially similar to data I/O lines 614, except that they are connected to modulation circuit 720. Data I/O lines 734 may be external to the memory dies 710 and provide for highspeed data transfers from the storage controller 701 to the data I/O lines 714.

The modulation circuit 720 is configured to multiplex DQ signals in one domain into another disparate domain such that multiple I/O data can be present on a single data I/O line at any given time without conflict, thereby enabling simultaneous (or near simultaneous) operation of at least two or more memory dies 710 at once. In some cases, all memory dies 710 may be operated at once as needed. In various embodiments, modulation circuit 720 is configured to convert data signals between a time domain and a frequency domain by modulating and/or demodulating I/O data from one domain to the other. Thus, I/O data can be separated into a series of non-overlapping frequency bands (also referred to herein as frequency channels) through frequency-division multiplexing (FDM), which can be supplied to the data I/O line as multiple data signals. That is, each frequency band (or channel) is isolated from neighboring frequency bands (or channels) The memory dies 710 can also be configured to modulate and/or demodulate I/O data from one domain to the other. Thus, multiple data signals can be processed by the memory system 700 simultaneously (or near simultaneously) through parallel operation of memory dies.

FIG. 7B depicts a graphical representation 740 of a plurality of data signals present on data I/O line 714a as an illustrative example. Graphical representation 740 shows I/O data 742a-742n plotted in the frequency domain. Each data signal 742 is multiplexed into a separate non-overlapping frequency band (or channel) on the data I/O line 714a. In the illustrative example of graphical representation 740, I/O data 742a is either transferred to or out of memory die 710a, I/O data 742b is either transferred to or out of memory die 710b, I/O data 742c is either transferred to or out of memory die 710c, and so on. Thus, for a given instance in time, the data I/O line 714a is able to carry all I/O data 742a-742n and enable parallel operation of memory dies 710a-710n.

In an illustrative example of data transferred into memory system 700 (e.g., DIN), as described above, DQ signals received from storage controller 701 via data I/O lines 734 may be provided in the time domain according to time-division multiplexing (TDM). Modulation circuit 720 can function to detect DQ signals encoded with I/O data in the time domain and convert the DQ signals into the frequency domain such that I/O data is encoded into separate frequency bands. That is, modulation circuit 720 can function to modulate the DQ signals so as to divide the I/O data on the DQ signals into a series of non-overlapping frequency bands (also referred to herein as frequency channels) through frequency-division multiplexing (FDM). The I/O data may be representative of bit values of I/O data encoded into the DQ signals. Each bit value can be encoded into a frequency band and supplied to a data I/O line as a data signal. As a result, a single data I/O line can carry a plurality of data signals, each encoded in a different frequency band (or channel) and destined for different memory dies. The I/O data in the frequency domain can then be supplied to data I/O lines 714 as a plurality of data signals.

At the memory dies 710, each memory die 710 can be configured to detect I/O data signals in the frequency domain at its respective data I/O contact 712. Upon detecting the I/O data signals in the frequency domain, the memory dies 710 can demodulate the I/O data signals to convert the I/O data signals in the frequency domain back to the time domain, such that operation of the memory dies 710 can proceed as described above in connection with FIGS. 1-5. For example, each memory die 710 comprises the I/O circuit 222 as described above and a transceiver interface circuit (described in more detail in connection with FIGS. 7A and 7B) that ingests the I/O data in the frequency domain, demodulates the I/O data, and then provides the I/O data to the I/O circuit 222 for completing an operation.

By separating the I/O data into non-overlapping frequency channels, multiple data signals, each representing a bit of I/O data, can be transmitted on a given data I/O line 714 simultaneously. Each frequency channel can be designated for an individual memory die 710 such that I/O data carried by one frequency channel or band is detected by one memory die 710 and I/O data carried by another frequency channel or band is detected by another memory die 710.

Thus, two or more memory dies 710 (up to all memory dies 710) can be operated in parallel approximately and simultaneously. As a result, total throughout of memory system 700 can be increased above that achieved by the conventional approaches described above. For example, total I/O throughput of memory system 700 can be increased to n times the throughput of a memory die, where n is the number of memory dies operated in parallel (e.g., up 8 memory dies in this example). Thus, total I/O throughput can be proportional to the number of memory dies 710 present in the memory system 700, and is no longer bottlenecked to a single memory die throughput. Additionally, total I/O throughput can scale with the number of memory dies 710 included in memory array 702.

In another example, I/O data can be retrieved by the memory die 710 for transfer to the storage controller 701. Each memory die 710 can modulate the I/O date (DOUT) into the frequency domain by modulating the I/O data at a frequency band designated for the memory die and supply the I/O data at the designated frequency band to data I/O lines 714. The Modulation circuit 720 detects I/O data at a number of non-overlapping frequency bands and demodulates the I/O data to convert to the time domain. Modulation circuit 720 then transmits DQ signals in the time domain to the storage controller 701. Thus, each memory die 710 can be operated in parallel to simultaneously (or near simultaneously) transfer I/O data out using non-overlapping frequency bands on a single data I/O line.

Figure 8:
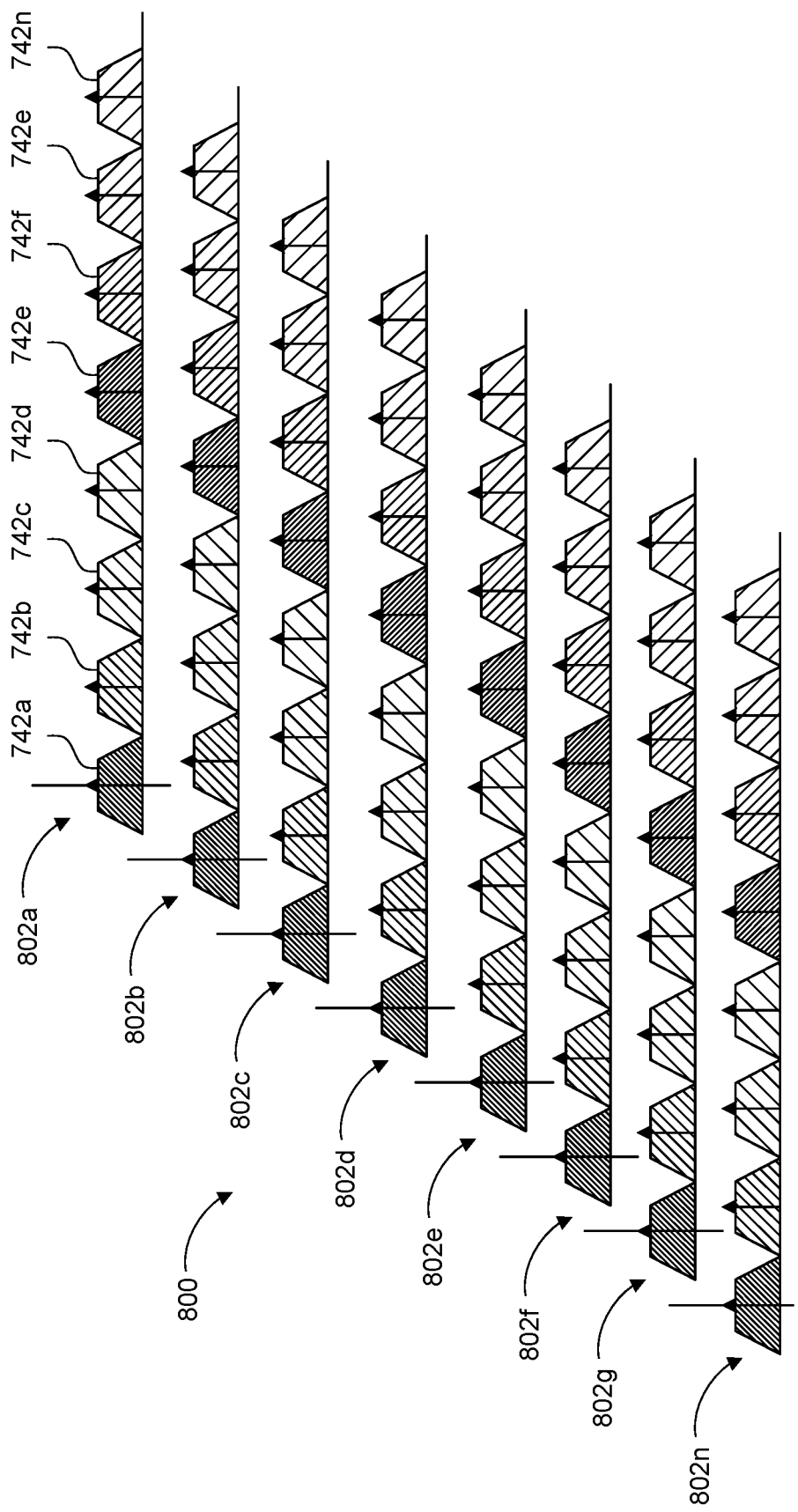
FIG. 8 depicts graphical representations of I/O data throughput on the plurality of data lines of memory array, in accordance with embodiments of the disclosed technology.

FIG. 8 depicts graphical representations 800a-800n of I/O data throughput on the plurality of data I/O lines 714a-714n of memory array 702 in accordance with embodiments of the disclosed technology. Each graphical representation 800 is similar to graphical representation 740 in that each Toggle Mode 800 depicts a plurality of I/O data plotted in the frequency domain that can be present on each respective data I/O line 714a-714n. For example, graphical representation 802a can be an example of graphical representation 740 that is representative of I/O data 742a-742n separated into non-overlapping frequency channels on the data I/O line 714a. Similarly, each data I/O line 714b-714n can also carry multiple I/O data separated into non-overlapping frequency channels that can be transferred to or out of each memory die 710b-710a. Accordingly, as shown in FIG. 8 and in the case of an 8 memory die stack with 8 data I/O lines, up to 64 bits of I/O data can be transferred at a given point in time (e.g., 8 bits on each data I/O line), compared to 8 bits at a given time in the case of the conventional systems (e.g., 1 bit on each data I/O line).

Returning to FIGS. 7A and 7B, frequency bands (or channels) can be designated for the memory dies 710. In an illustrative example, each memory die 710 may be associated with a given frequency band, such that a first frequency band may be associated with memory die 710a, a second frequency band may be associated with memory die 710b, and so on. Modulation circuit 720 may be configured to modulate I/O data corresponding to a given memory die 710 into the associated frequency band and demodulate I/O data in an associated frequency band into the time domain so that the I/O data can be reconstructed in the time domain according to which memory die 710 provided which piece of I/O data. In an example implementation, a single frequency band may be designated for a memory die, such that I/O data for that memory die is modulated at the designated frequency regardless as to which data I/O line 714 the I/O data will be supplied onto. In another example, I/O data associated with a given memory die can be modulated at different frequency bands for each data I/O line 714. In this case, for example, I/O data corresponding to memory die 710a on data I/O line 714a may be carried at a first frequency band while I/O data corresponding to memory die 710a on data I/O line 714b may be carried at a second frequency band, and so on. Bandwidth utilization can be optimized through shuffling of the frequency bands associated with each memory die, as well as shuffling the number of frequency bands associated with a given memory die.

Figure 9:
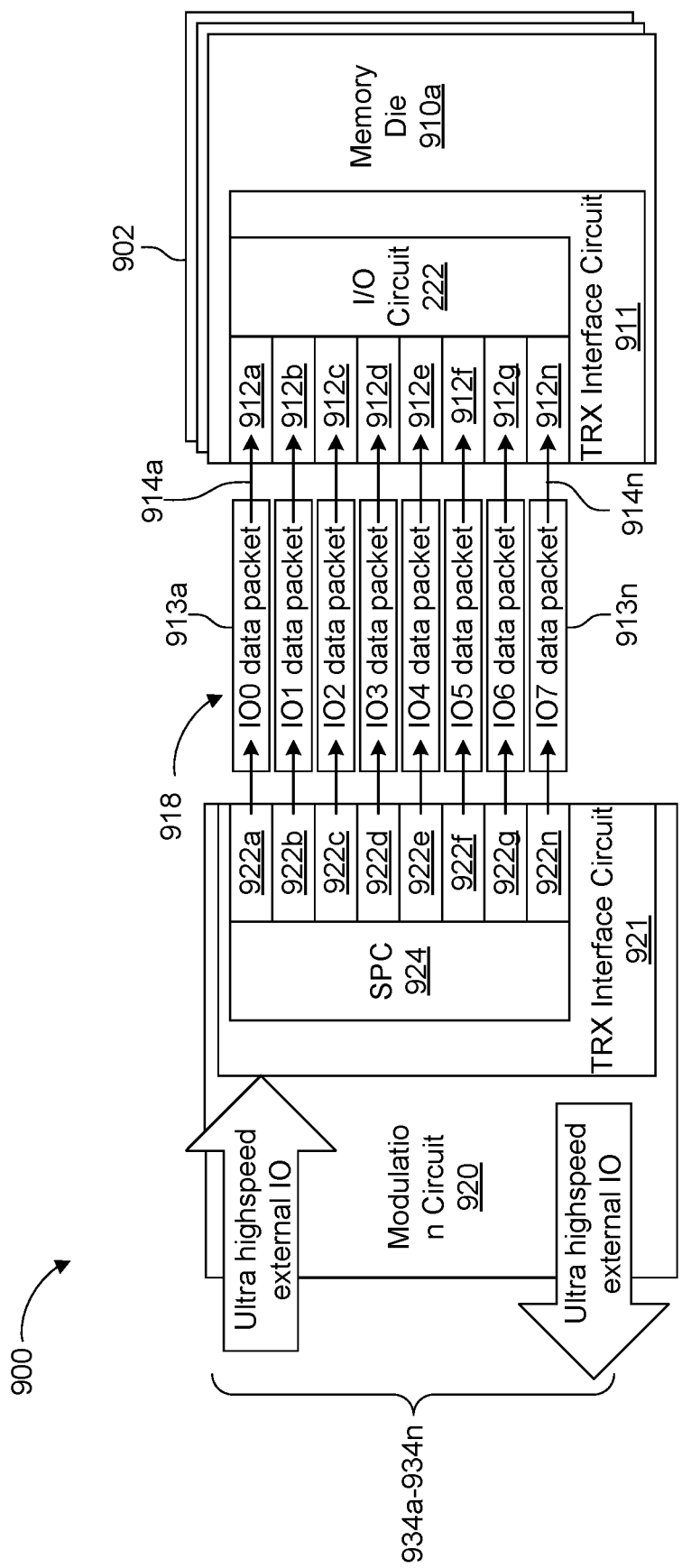
FIG. 9 is an example block diagram of a system architecture 900 for multi-memory die parallel data operations, in accordance with embodiments of the disclosed technology.

FIG. 9 is an example block diagram of a system architecture 900 for multi-memory die parallel data operations, in accordance with embodiments of the disclosed technology. The system architecture 900, which is substantially similar to memory system 700 of FIGS. 7A and 7B, includes a memory array 902 and a modulation circuit 920. Memory array 902 and modulation circuit 920 may be substantially similar to memory array 702 and modulation circuit 720 of FIGS. 7A-7B, respectively, except as provided below. Memory die 910 can be communicatively coupled to a storage controller via a data bus consisting of data I/O lines 934a-934n, which may be substantially similar to data I/O lines 734a-734n. As described above, memory array 902 comprises a plurality of memory dies 910a-910n, each of which is communicatively coupled to the modulation circuit 920 through a plurality of data I/O lines, such as data I/O lines 714a-714n of FIGS. 7A and 7B. The following description is made with reference to a single memory die 910a as an illustrative example; however, the disclosure herein applies equally to each memory die 910 of memory array 902. Thus, as used herein, memory die 910 may refer to any one of the memory dies of the memory array 902. Each memory die 910 can be substantially similar to the memory dies 710 described above in connection with FIGS. 7A-7B, except as provided below.

Memory die 910a comprises a transceiver interface circuit 911 connected to a transceiver interface circuit 921 of the modulation circuit 920 via a memory die interface 918. Memory die interface 918 may comprise a data bus consisting of a plurality of data I/O lines 914a-914n, such as data I/O lines 714a-714n as described in connection with FIGS. 7A and 7B. I/O data is exchanged between modulation circuit 920 and memory die 910 via the memory die interface 918 as data signals, with each data signal encoded with a data packet 913a-913n carried on a corresponding data I/O line 914a-914n. Transceiver interface circuit 911 comprises a plurality of I/O transceiver circuits 912a-912n connected to each data I/O line 914a-914n on the memory die interface 918 and transferring data signals encoded with data packets 913a-913n on each corresponding data I/O line 914a-914n. The transceiver interface circuit 911 is connected to a I/O circuit 915, which is substantially similar to I/O circuit 222 described above in connection with FIG. 2. While not shown in FIG. 9, each I/O transceiver circuits 912a-912n may comprise or be connected to a data I/O contact, such as a data I/O contact 712 as described above.

The transceiver interface circuit 921 of memory die 910 comprises a plurality of I/O transceiver circuits 922a-922n and a serial-to-parallel converter (SPC) 924. The serial-to-parallel converter 924 may be configured to operate as a serializer and/or a paralyzer, depending on the direction of data transfer. For example, in the case of DIN from a storage controller destined for a memory die 910, serial-to-parallel converter 924 can perform a serial to parallel operation in which DIN received in a serial format (e.g., time domain) can be parallelized into a plurality of outputs. In this case, DIN receiver in the time domain can be slotted into parallel operations on the plurality of plurality of I/O transceiver circuits 922a-922n. Alternatively, in the case of DOUT from the memory die to the storage controller, serial-to-parallel converter 924 can perform a parallel to serial operation in which DOUT received approximately simultaneously in parallel can be serialized into slots (or frames) for transmission to the storage controller in the time domain. The I/O transceiver circuits 922a-922n transfer data signals encoded with data packets 913a-913n on each corresponding data I/O line 914a-914n either to or from corresponding I/O transceiver circuits 912a-912n.

The I/O transceiver circuits (e.g., I/O transceiver circuits 912a-912n and/or I/O transceiver circuits 922a-922n) are configured to convert data signals from one domain to another disparate domain by modulating and/or demodulating the data signals depending on the direction of transfer. That is, in the case of data supplied to a data I/O line 914, I/O transceiver circuits can be configured to effectuate FDM by modulating a data packet 913 in a designated frequency band, encode the data packet 913 into a data signal, and supply the data signal to a data I/O line 914. The modulation is executed such that the frequency band does not overlap with frequency bands of other data packets on the same data I/O line 914. Alternatively, in the case of data detected on a data I/O line 914, I/O transceiver circuits can be configured to effectuate TDM by demodulating a data packet 913 detected in a designated frequency band and transmit the demodulated data packet downstream for storage in a memory structure of memory die 910 (e.g., a DIN operation) or transmission to a storage controller (e.g., a DOUT operation). I/O circuit 915 transfers I/O data in the time domain and thus operates in a substantially similar manner to I/O circuit 222 described above.

As an illustrative example, a DIN operation will now be described with reference to FIG. 9. In this case, DQ signals can be received by modulation circuit 920 in the time domain from a storage controller via data I/O lines 934. The data pattern encoded in the DQ signals may comprise bit values (I/O data) serially separated in time according to TDM. Serial-to-parallel converter 924 ingests the serially received DQ signals, and parallelizes the bits of data into each I/O transceiver circuit 922. Each I/O transceiver circuit 922 encodes a data signal with a data packet 913 having a bit value in a payload and modulates the data signal at a designated frequency band. The frequency band for each I/O transceiver circuit 922 may be the same (e.g., a common frequency band for a given memory die) or different. The modulated data signals are then supplied to the data I/O lines 914 via respective data I/O contracts at the modulation circuit 920 (such as data I/O contacts 722 of FIGS. 7A and 7B). Data signals are received at the I/O transceiver circuits 912 and are demodulated to convert back to the time domain. I/O circuit 915 can then decode the data signal to obtain the bit value and proceed with storing the bit value to a memory structure, as described above.

As another illustrative example, a DOUT operation will now be described with reference to FIG. 9. In this case, I/O circuit 915 obtains bit values from a memory structure as described above and generates data packets 913 having bit values provided in the payloads of data packets 913. The data packets 913 are provided to the I/O transceiver circuits 912, which modulates the data packets 913 at a designated frequency band. The frequency band for each I/O transceiver circuit 912 may be the same (e.g., a common frequency band for a given memory die) or different. The modulated data packets are then supplied to the data I/O lines 914 and transferred to the modulation circuit 920. Each I/O transceiver circuit 922 receives the data signals and demodulates the data signals into the time domain. The SPC 924 ingests the parallelly received data packets 913, and serializes the bits of data from each I/O transceiver circuit 922. The serialized bits of data are encoded into DQ signals as data patterns in the time domain and supplied to data I/O lines 934 for transmission to a storage controller.

In some embodiments, each data packet 913 comprises a preamble (also referred to herein as a die specific preamble as each preamble corresponds to one of memory dies 910) and a payload. As described above, the payload can comprise I/O data such as bit values. The preamble can comprise a flag value that, if toggled, activates a receiving I/O transceiver circuit 912 and/or 922. For example, in some implementations, each I/O transceiver circuit may be in a low power or standby mode to conserver power (e.g., the receiving I/O transceiver circuit is powered on but with a reduced amplifier power and a transmitter branch turned off). Upon receiving a data packet 913 having the preamble toggled, the receiving I/O transceiver is activated and detects the data signal carrying the data packet 913. For example, responsive demodulating and detecting a data packet 913, the receiving I/O transceiver circuit can enter a normal operation mode (e.g., activating the transmitter branch and providing full power to the amplifier).

The preamble can be any bit sequence specific to a corresponding memory die 910. Thus, each data packet 913 can have a unique bit sequence in the preamble that can be detected and used to identify a corresponding memory die 910. The preamble can be provided to logic in the receiving transceiver interface circuit (e.g., transceiver interface circuit 921 or transceiver interface circuit 911 depending on the direction of data transfer into or out of memory dies 910) and this logic can set an enable flag in the receiver I/O transceiver circuit. In an example implementation, the preamble can be a sequence of 10101. To provide for die specific preambles, the preamble for a memory die 910a (e.g., die 0) can be set to 10101000 while preamble for memory die 910n (e.g., die 8 in a 8 die stack) may be set to 10101111. In this example, the bit sequence 10101 can eb used to activate the receiver I/O transceiver circuit and the remaining bit sequence (e.g., 000, . . . , and 111) can represent corresponding memory dies as a unique identifier or address. The bit sequence 10101 in this example can be processed by the logic to set an enable flag in the receiver I/O transceiver circuit In some implementations, the transceiver interface circuit 921 may be configured to avoid data access conflicts that could result from race conditions during serialization of the parallel data from multiple memory. For example, the die specific preambles appended to each packet 913, as described above, can be provided to show which packet 913 belong to which memory die 910. Furthermore, the die specific preamble can also function as chip enable signal, as described above. To implement this die specific preamble scheme, the SPC 924 can contain logic configured to reorder received data according to the corresponding die specific preamble.

Figure 10:
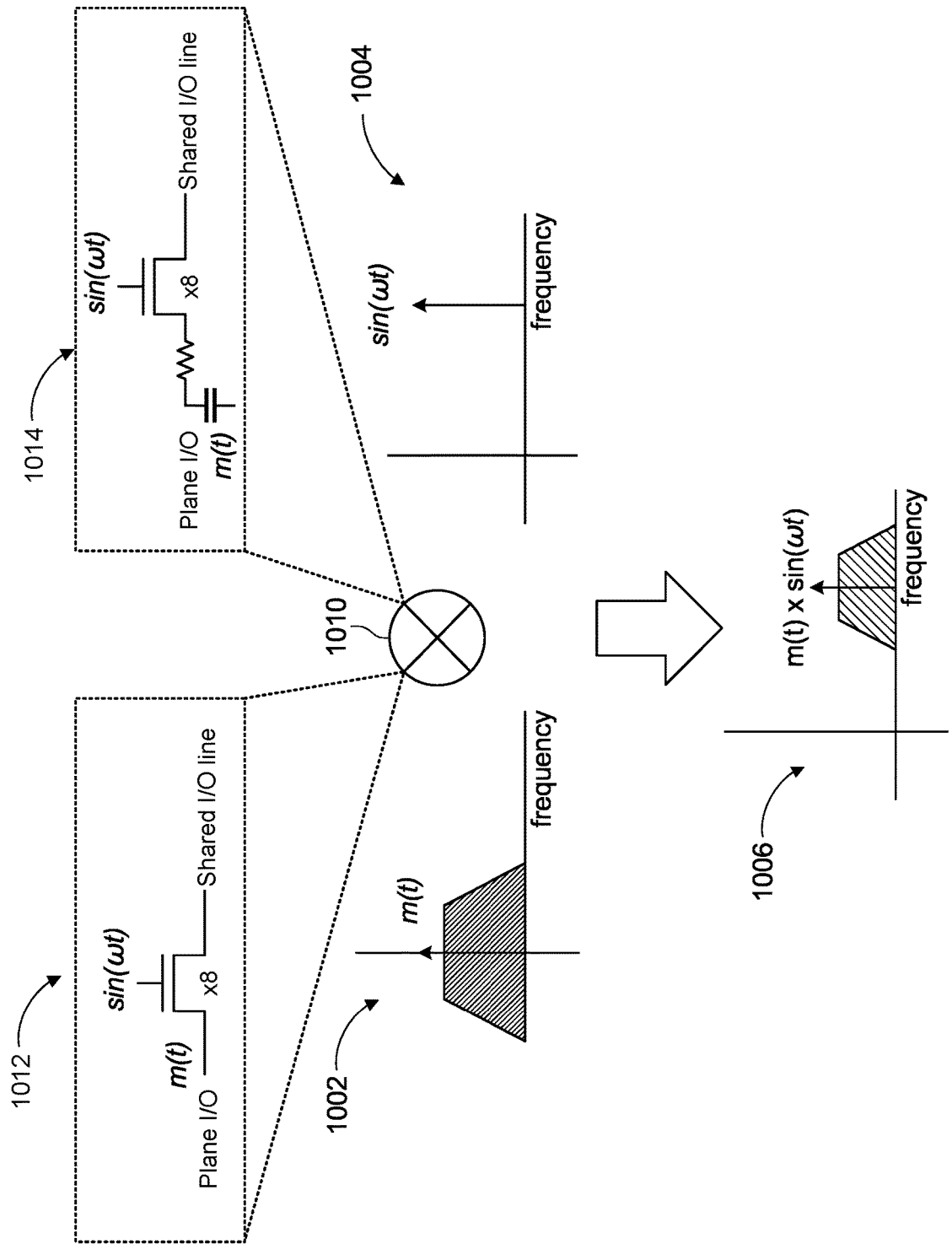
FIG. 10 is an schematic diagram of modulation and demodulation for effectuating frequency-division multiplexing, in accordance with an example implementation of the disclosed technology.

FIG. 10 is an schematic diagram of modulation and demodulation for effectuating frequency-division multiplexing, in accordance with an example implementation of the disclosed technology. FIG. 10 depicts a graphical representation 1002 of I/O data received in the time domain, similar to I/O data 620 of FIG. 6. The I/O data in the time domain is applied to a mixer 1010 configured to shift the base frequency of the I/O data in the time domain to a designated frequency in the frequency domain, shown as sin(ωt) in 1004, where w can be set to control the specific frequency band to which it will be shifted. The mixer 1010 outputs I/O data that is frequency-shifted to propagate at the designated frequency band, as shown in graphical representation 1006. In this case, the shift is mathematically achieved as the base signal m(t) by the frequency shift (e.g., m(t)×sin(ωt)).

FIG. 10 also illustrates example circuit implementations of mixer 1010 depending on the direction of operation. Circuit 1012 can be used to modulate an input signal at a designated frequency (e.g., shift the frequency band to the designated frequency band). For example, an input I/O data on a plane I/O line (e.g., from storage controller) can be supplied to a transistor having a designated frequency applied to a gate terminal. As a result, a frequency-shifted signal is output to the shared data I/O line, which propagates on the shared data I/O line in a frequency band based on the frequency applied to the gate terminal. Circuit 1014 can be used to demodulate an input signal (e.g., shift the frequency band to the base band). For example, an input I/O data on a shared I/O line can be supplied to a transistor having a designated frequency applied to a gate terminal and connected to a resistor and capacitor in series. As a result, an I/O data signal is output to the plane data I/O line, which propagates at the base band.

In an example implementation, a number of circuits 1012 can be provided to modulate input I/O data signals into a number of separate non-overlapping frequency bands. In this case, each circuit 1012 can be provided with a different frequency applied to the gate terminal so to induce a frequency shift as described above. The applied frequencies can be selected so to be spaced apart and non-overlapping. Further, a number of circuits 1014 can be provided to demodulate input I/O data signals carried by a number of separate non-overlapping frequency bands into a single frequency band for TDM. In this case, each circuit 1014 can be provided with a different frequency applied to the gate terminal so to induce a frequency shift as described above. In an example implementation, each I/O transceiver circuit 922 and 912 may comprise a circuit 1012 and a circuit 1014 pair.

Figure 11:
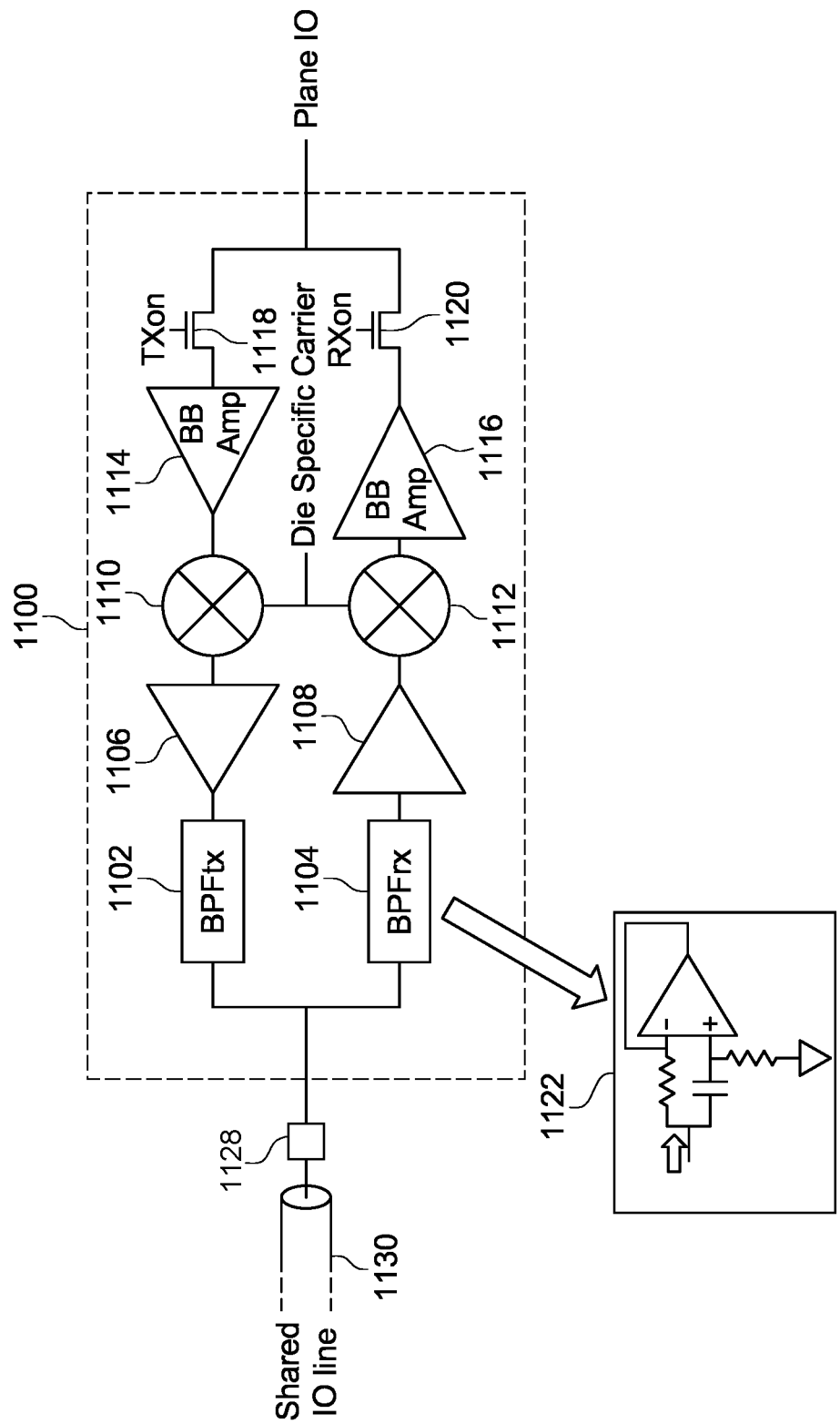
FIG. 11 is an example circuit implementation of an I/O transceiver, in accordance with an example implementation of the disclosed technology.

FIG. 11 is an example circuit implementation of an I/O transceiver, in accordance with an example implementation of the disclosed technology. FIG. 11 depicts circuit 1100 that can be used as any one of I/O transceiver circuit 912 or I/O transceiver circuit 922 as described in connection with FIG. 9. In this case, circuit 1100 is connected to a shared data I/O line (e.g., a data I/O line 914) via an electrical contact or terminal 1128 (e.g., a pin, pad, or the like) and is connected to a plane data I/O line. Circuit 1100 operates in one direction to receive I/O data modulated at a designated frequency on the shared I/O line and demodulates the I/O data onto the plane data I/O line. In another example, circuit 1100 can operate to receive I/O data on the plane data I/O line and modulate the I/O at a designated frequency so to provide the I/O data to the shared I/O line at a designated frequency band.

Circuit 1100 comprises a transmission data path and a receiver data path. The transmission data path comprises a first bandpass filter 1102 (sometimes referred to as BPFtx) connected to a first high-frequency amplifier 1106, a modulation mixer 1110, and a first baseband amplifier 1114. A transmission transistor 1118 is connected between the baseband amplifier 1114 and the plane data I/O line. The gate of the transistor 1118 can be configured to receive an input command to activate the transmission data path, for example, as the flag value of a data packet preamble. Upon activation, I/O data on the plane data I/O line is passed to the first baseband amplifier 1114 and to the modulation mixer 1110, which modulates the I/O data according to die-specific carrier information input into the mixer. For example, modulation mixer 1110 may be provided as circuit 1012 of FIG. 10 and the die-specific carrier information may be supplied as a target or designated frequency for the memory die on which circuit 1100 is provided. The circuit 1100 modulates the I/O data at the designated frequency, which is passed to the first high-frequency amplifier 1106 and through the bandpass filters 1102. As a result, I/O data in the designated frequency band is supplied to the shared data I/O line.

The transmission data path comprises a second bandpass filter 1104 (sometimes referred to as BPFrx) connected to a second high-frequency amplifier 1108, a demodulation mixer 1112, and a second baseband amplifier 1116. A receiving transistor 1120 is connected between the baseband amplifier 1116 and the plane data I/O line. The gate of the transistor 1120 can be configured to receive an input command to activate the receiver data path, for example, as the flag value of a data packet preamble. Upon activation, I/O data in a designated frequency band on the shared data I/O line is passed to the second bandpass filter 1104 and to second high-frequency amplifier 1108, which function to filter out frequency bands that are not designated for the memory die. Thus, demodulation mixer 1112 receives I/O data at the frequency band designated for this memory die. Demodulation mixer 1112 demodulates the I/O data according to die-specific carrier information input into the mixer and provides the demodulated I/O data to the second baseband amplifier 1116. In one example, demodulation mixer 1112 may be implemented as circuit 1014. In another example, demodulation mixer 1112 need not include the resistor or capacitor shown in 1014 due to the operation of second bandpass filter 1104 and second high-frequency amplifier 1108. The demodulated I/O data is passed to the 1116 and then is output onto the plane I/O line.

The first and second bandpass filters can be implemented, for example, as any bandpass filter known in the art. For example, bandpass filters 1102 and/or 1104 can be implemented as a gyrator-based simulated inductor, shown as sub circuit 1122. In another example, bandpass filters 1102 and/or 1104 can be implemented as transmission line stubs, such as for high-frequency uses cases. The bandpass filters disclosed herein are not limited to these example implementations, and any bandpass filter may be used in accordance with embodiments disclosed herein.

In an example implementation, the memory die-specific carrier information can be set during an initialization phase of the memory system. During the initialization phase, frequency bands are assigned to the memory dies of a memory array (e.g., memory array 702 and/or memory array 902). In another example, frequency bands can be assigned on a I/O transceiver circuit basis such that each memory die can be assigned a number of frequency bands, one for each I/O transceiver circuit. This works as long as I/O transceivers connected to a common shared I/O line are assigned separate frequency bands that do not overlap with others on the same shared I/O line. In some implementations, frequency bands can be assigned in a first-in-first-out protocol, whereby frequency bands are assigned to the first memory die (or first I/O transceiver circuit) that comes on line, then the next, and so on.

Figure 12:
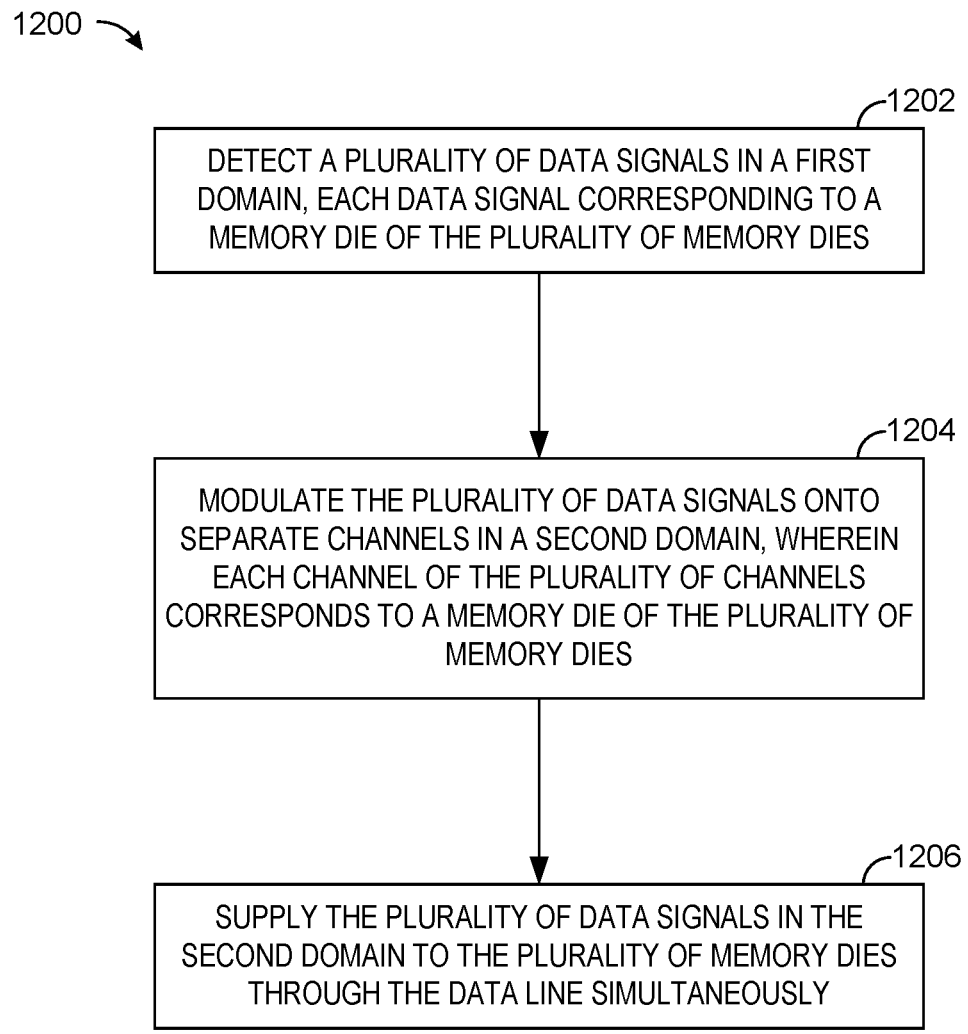
FIG. 12 is a flowchart of illustrative method 1200 for multi-memory die operation, according to example embodiments of the disclosed technology.

FIG. 12 is a flowchart of illustrative method 1200 for multi-memory die operation according to example embodiments of the disclosed technology. The method 1200 may be performed by a controller such as a modulation circuit (e.g., modulation circuit 720 and/or modulation circuit 920) and/or or memory dies (e.g., [no text] 710 and/or memory die 910). More generally, the method 1200 may be performed by any volatile or non-volatile memory system configured to interface with a memory device such as a NAND device (or that is embedded therein) including, without limitation, a separately provided DRAM, an embedded microcontroller, or the like. In some embodiments, the instructions for performing the method 1200 may be hardwired or fused into the memory core.

Referring now to FIG. 12, at block 1202 a plurality of data signals are detected in a first domain. Each data signal corresponds to a memory die of a plurality of memory dies. As described above, data signals can be detected, for example, by a modulation circuit (e.g., modulation circuit 920 and/or modulation circuit 720) in a time domain. Each data signals contains either DIN for a data write operation to a corresponding memory die (e.g., one of memory dies 710 and/or memory dies 910) of a memory array or as DOUT for a data read operation from a corresponding memory die.

At block 1204, the plurality of data signals can be modulated onto separate channels in a second domain, wherein each channel of the plurality of channels corresponds to a memory die of the plurality of memory die. For example, as described above, a modulation circuit can function to modulate each data signal into a frequency domain onto a separate frequency channel. Each frequency channel may be associated with a different memory die of the memory array.

At block 1206, the plurality of the plurality of data signals are simultaneously supplied to the plurality of memory dies in the second domain through a data line connected to each of the plurality of memory dies. For example, as described above, the modulation circuit, can simultaneously provide each data signal, modulated on a different frequency channel, onto data lines of a data bus (e.g., data bus 228) of a memory interface. In this way, multiple data signals can be carried on a common data line simultaneously and be received by each corresponding memory die nearly simultaneously.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction or many instructions and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction-execution system, apparatus, processor, or device.

Computer-program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the modules described herein may, in certain embodiments, alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed loop. In another embodiment, however, a set of components that does not include a return pathway for electrical current may be referred to as a circuit (e.g., an open loop). For example, an integrated circuit may be referred to as a circuit regardless of whether or not the integrated circuit is coupled to ground (as a return pathway for electrical current). In various embodiments, a circuit may include a portion of an integrated circuit, an integrated circuit, a set of integrated circuits, a set of non-integrated electrical and/or electrical components with or without integrated circuit devices, or the like. In an embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field-programmable gate array, programmable array logic, programmable logic device, or the like (e.g., as firmware, a netlist, or the like). A circuit may comprise one or more silicon integrated-circuit devices (e.g., chips, die, die planes, packages) or other discrete electrical devices in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrase "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order as noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

What is claimed is:

1. A memory device, comprising:
    a memory array comprising a plurality of memory dies, each memory die comprising a contact terminal connected to an input/output (I/O) circuit;
    a data bus connected to each contact terminal of the plurality of memory dies; and
    a modulation circuit connected to the data line bus, the modulation circuit configured to:
        detect a plurality of data signals in a first domain, each data signal corresponding to a memory die of the plurality of memory dies;
        modulate the plurality of data signals onto a plurality of separate channels in a second domain, wherein each channel of the plurality of separate channels corresponds to a memory die of the plurality of memory dies; and
        simultaneously supply the plurality of modulated data signals in the second domain to the plurality of memory dies through the data bus.

2. The memory device of claim 1, wherein the first domain is a time domain and the second domain is a frequency domain.

3. The memory device of claim 2, wherein each channel of the plurality of separate channels is isolated from each other in the frequency domain.

4. The memory device of claim 1, wherein the plurality of memory dies are operated in parallel and receive the plurality of data signals approximately simultaneously.

5. The memory device of claim 1, wherein a respective I/O circuit of a respective memory die is configured to:
    detect a data signal in the second domain on a channel of the plurality of separate channels corresponding to the respective memory die;
    demodulate the detected data signal into the first domain; and
    latch bit values encoded in the data signal to a memory structure of the respective memory die.

6. The memory device of claim 1, wherein the I/O circuits of the plurality of memory die are configured to:
    generate a plurality of second data signals in the first domain, each of the plurality of second data signal encoded with a data pattern based on bit values stored in a memory structure of a respective memory die;
    modulate the plurality of second data signals onto separate channels in the second domain; and
    supply the plurality of second data signals in the second domain to the modulation circuit through the data bus simultaneously.

7. The memory device of claim 6, wherein the modulation circuit is further configured to demodulate the plurality of second data signals in the second domain to the first domain.

8. A method comprising:
    detecting a plurality of data signals in a first domain, each data signal corresponding to a memory die of a plurality of memory dies;
    modulating the plurality of data signals onto a plurality of separate channels in a second domain, wherein each channel of the plurality of separate channels corresponds to a memory die of the plurality of memory dies; and simultaneously supplying the plurality of data signals in the second domain to the plurality of memory dies through a data bus connected to each of the plurality of memory dies.

9. The method of claim 8, wherein the first domain is a time domain and the second domain is a frequency domain.

10. The method of claim 9, wherein each channel of the plurality of separate channels is isolated from each other in the frequency domain.

11. The method of claim 8, wherein the plurality of memory dies are operated in parallel and receive the plurality of data signals approximately simultaneously.

12. The method of claim 8, further comprising:
detecting a data signal in the second domain on a channel of the plurality of separate channels corresponding to a respective memory die;
demodulating the detected data signal into the first domain; and
latching bit values encoded in the data signal to a memory structure of the respective memory die.

13. The method of claim 8, further comprising:
generating a plurality of second data signals in the first domain, each of the plurality of second data signal encoded with a data pattern based on bit values stored in a memory structure of a respective memory die;
modulating the plurality of second data signals onto separate channels in the second domain; and
supplying the plurality of second data signals in the second domain to the plurality of memory dies through the data bus simultaneously.

14. The method of claim 13, further comprising:
demodulating the plurality of second data signals in the second domain to the first domain.

15. A memory system, the system comprising:
a memory array comprising a plurality of memory dies, each memory die comprising a contact terminal connected to an input/output (I/O) circuit;
a data bus connected to each contact terminal of the plurality of memory dies; and
at least one transceiver interface circuit connected to the data bus, the transceiver interface circuit configured to:
convert a plurality of first data signals, each first data signal corresponding to a memory die of the plurality of memory dies, to a plurality of second data signal by multiplexing the plurality of first data signals from a time domain into a plurality of separate frequencies of a frequency domain, wherein each frequency of the plurality of separate frequencies corresponds to a memory die of the plurality of memory dies; and
provide the plurality of second data signals in the frequency domain onto the data bus.

16. The memory system of claim 15, wherein the transceiver interface circuit comprises a plurality of transceiver interface circuits, wherein each memory die of the plurality of memory dies comprise a transceiver interface circuit of the plurality of transceiver interface circuits.

17. The memory system of claim 16, further comprising:
a modulation circuit connected to the data bus,
wherein the plurality of memory dies are operated in parallel and provide the plurality of second data signals to the modulation circuit approximately simultaneously.

18. The memory system of claim 15, further comprising:
a modulation circuit comprising the at least one transceiver interface circuit.

19. The memory system of claim 18, wherein the plurality of memory dies are operated in parallel and receive the plurality of second data signals from the modulation circuit approximately simultaneously.

20. The memory system of claim 15, wherein each of the plurality of second data signals comprises a preamble and a payload containing data, wherein the preamble comprises a unique bit sequence that identifies a memory die of the plurality of memory dies corresponding to a respective second data signal.

* * * * *